US011483279B2

(12) United States Patent
Grayson et al.

(10) Patent No.: US 11,483,279 B2
(45) Date of Patent: Oct. 25, 2022

(54) DOMAIN NAME SYSTEM AS AN AUTHORITATIVE SOURCE FOR MULTIPATH MOBILITY POLICY

(71) Applicant: Cisco Technology, Inc., San Jose, CA (US)

(72) Inventors: Mark Grayson, Berkshire (GB); Oliver James Bull, Bristol (GB); Louis Gwyn Samuel, Wiltshire (GB); Srinath Gundavelli, San Jose, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 16/850,081

(22) Filed: Apr. 16, 2020

(65) Prior Publication Data

US 2021/0152513 A1 May 20, 2021

Related U.S. Application Data

(60) Provisional application No. 62/935,727, filed on Nov. 15, 2019.

(51) Int. Cl.
*H04L 45/24* (2022.01)
*H04L 47/20* (2022.01)
(Continued)

(52) U.S. Cl.
CPC .......... *H04L 61/1511* (2013.01); *G06F 9/547* (2013.01); *H04L 41/0893* (2013.01);
(Continued)

(58) Field of Classification Search
CPC . H04L 61/1511; H04L 45/24; H04L 41/0893; H04L 69/326; H04L 47/20; H04L 45/308; H04L 47/2441; G06F 9/547
See application file for complete search history.

(56) References Cited

U.S. PATENT DOCUMENTS 9,860,812 B2  1/2018 Tipton et al.
10,075,343 B2 * 9/2018 Burk .................. G06F 16/2365
(Continued)

FOREIGN PATENT DOCUMENTS

EP    2953398 B1    6/2018
WO    2019197016 A1   10/2019
WO    2021045859 A1    3/2021

OTHER PUBLICATIONS

Mauro Sardara et al., "A Transport Layer and Socket API for (h)ICN: Design, Implementation and Performance Analysis", Proceedings of the 5th ACM Conference on Information-Centric Networking, Boston, MA, Sep. 21-23, 2018, 11 pages.
(Continued)

*Primary Examiner* — Aftab N. Khan
(74) *Attorney, Agent, or Firm* — Edell, Shapiro & Finnan, LLC

(57) ABSTRACT

Techniques are described to provide multipath mobility via Domain Name System-as-an-Authoritative Source (DNS-AS) techniques. In one example, a method includes obtaining, by a multipath policy decision element, a plurality of multipath policy recommendations for an application, wherein the plurality of multipath policy recommendations are obtained from one or more multipath policy recommendation elements; combining the plurality of multipath policy recommendations to generate a policy enforcement decision, wherein the policy enforcement decision identifies, at least in part, one or more network paths that are to be utilized for one or more packet flows associated with the application, wherein each of the one or more network paths is associated with an access type; and enforcing the policy enforcement decision for one or more packet flows associated with the application.

20 Claims, 16 Drawing Sheets

(51) Int. Cl.
  H04L 61/4511       (2022.01)
  G06F 9/54          (2006.01)
  H04L 41/0893       (2022.01)
  H04L 69/326        (2022.01)
(52) U.S. Cl.
  CPC .............. H04L 45/24 (2013.01); H04L 47/20
                  (2013.01); H04L 69/326 (2013.01)

(56) References Cited

U.S. PATENT DOCUMENTS

| | | | |
|---|---|---|---|
| 11,063,785 B2* | 7/2021 | Milescu | H04L 47/283 |
| 11,178,725 B2* | 11/2021 | Talebi Fard | H04W 28/08 |
| 11,245,717 B1* | 2/2022 | Edwards | H04L 63/0838 |
| 2002/0122422 A1 | 9/2002 | Kenney et al. | |
| 2008/0225722 A1 | 9/2008 | Khemani et al. | |
| 2008/0301332 A1* | 12/2008 | Butler | H04L 45/00 710/38 |
| 2013/0111038 A1* | 5/2013 | Girard | H04W 80/06 709/226 |
| 2013/0176908 A1* | 7/2013 | Baniel | H04L 41/5022 370/259 |
| 2014/0089500 A1* | 3/2014 | Sankar | H04L 67/1031 709/224 |
| 2014/0161055 A1 | 6/2014 | Chitrapu et al. | |
| 2014/0226469 A1 | 8/2014 | Stewart | |
| 2015/0327114 A1 | 11/2015 | Gupta et al. | |
| 2016/0095017 A1* | 3/2016 | Ely | H04W 16/14 455/454 |
| 2016/0112239 A1* | 4/2016 | Kanugovi | H04W 88/16 370/338 |
| 2016/0164825 A1 | 6/2016 | Riedel et al. | |
| 2016/0164826 A1* | 6/2016 | Riedel | H04L 61/1511 709/223 |
| 2016/0191635 A1* | 6/2016 | Greenan | H04L 67/16 709/219 |
| 2016/0359673 A1 | 12/2016 | Gupta et al. | |
| 2016/0360464 A1 | 12/2016 | Han et al. | |
| 2017/0118687 A1* | 4/2017 | Tipton | H04L 12/5692 |
| 2017/0311197 A1 | 10/2017 | Lopes et al. | |
| 2018/0097725 A1* | 4/2018 | Wood | H04L 45/02 |
| 2019/0069194 A1 | 2/2019 | Jun et al. | |
| 2019/0182165 A1 | 6/2019 | Yang et al. | |
| 2019/0268375 A1* | 8/2019 | Gundavelli | H04L 63/083 |
| 2019/0268777 A1* | 8/2019 | Simon | H04N 21/6131 |
| 2019/0274178 A1 | 9/2019 | Salkintzis et al. | |
| 2019/0306752 A1* | 10/2019 | Lai | H04W 88/06 |
| 2019/0373505 A1 | 12/2019 | Jun et al. | |
| 2019/0394279 A1 | 12/2019 | Dao et al. | |
| 2019/0394833 A1 | 12/2019 | Talebi Fard et al. | |
| 2021/0006491 A1* | 1/2021 | Amend | H04L 69/14 |
| 2021/0092645 A1* | 3/2021 | Grayson | H04W 28/18 |
| 2021/0092664 A1* | 3/2021 | Lai | H04W 76/16 |
| 2021/0105660 A1* | 4/2021 | Jeong | H04W 28/0289 |
| 2021/0120596 A1 | 4/2021 | Youn et al. | |
| 2021/0135944 A1* | 5/2021 | S | H04W 80/06 |

OTHER PUBLICATIONS

WBA 5G Workgroup, "Unlicensed Integration with 5G Networks", Wireless Broadband Alliance Members, Version 1.0, Oct. 2018, 63 pages.
David Brossard, "Understanding XACML combining algorithms", Axiomatics, Jul. 15, 2014, 7 pages; retrieved from Internet Aug. 13, 2019.
Wikipedia, "Transport layer", Wikipedia The Free Encyclopedia, 6 pages; retrieved from Internet Nov. 6, 2019.
Paul Ashley et al., "The Enterprise Privacy Authorization Language (EPAL)", 8 pages, retrieved from Internet Dec. 18, 2019; https://www.w3.org/2003/p3p-ws/pp/ibm3.html.
M. Welzl et al., "On the Usage of Transport Features Provided by IETF Transport Protocols" Internet Engineering Task Force (IETF), Feb. 2018, 56 pages.
D. Anipko, Ed. et al., "Multiple Provisioning Domain Architecture", Internet Engineering Task Force (IETF), Jun. 2015, 25 pages.
M. Scharf et al., "Multipath TCP (MPTCP) Application Interface Considerations", Internet Engineering Task Force (IETF), Mar. 2013, 31 pages.
B. Claise et al., "Cisco Systems Export of Application Information in IP Flow Information Export (IPFIX)", Internet Engineering Task Force (IETF), Nov. 2012, 43 pages.
A. Ford et al., "Architectural Guidelines for Multipath TCP Development", Internet Engineering Task Force (IETF), Mar. 2011, 28 pages.
R. Rosenbaum et al., "Using the Domain Name System To Store Arbitrary String Attributes", Network Working Group, May 1993, 4 pages.
Cisco, "NBAR2 or Next Generation NBAR", Cisco, Jan. 2013, 8 pages.
Cisco, "Network-Based Application Recognition", Cisco, Mar. 2009, 8 pages.
Ramli, C. D. P. K., "Modelling and Analysing Access Control Policies in XACML 3.0", Kgs. Lyngby: Technical University of Denmark (DTU). DTU Compute PHD-2015, No. 364, 240 pages.
Hal Lochhart et al., "OASIS extensible Access Control Markup Language (XACML) TC", OASIS, 2017, 9 pages.
A. Brunstrom, Ed. et al., "Implementing Interfaces to Transport Services draft-ietf-taps-impl-05", TAPS Working Group, Nov. 4, 2019, 48 pages.
T. Pauly, Ed. et al., "An Architecture for Transport Services draft-ietf-taps-arch-05", TAPS Working Group, Nov. 4, 2019, 26 pages.
T. Pauly, Ed. et al., "An Architecture for Transport Services draft-ietf-taps-arch-04" TAPS Working Group, Jul. 8, 2019, 25 pages.
T. Pauly, Ed. et al., "An Architecture for Transport Services draft-ietf-taps-arch-03", TAPS Working Group, Mar. 11, 2019, 25 pages.
J. Iyengar, Ed. et al., "QUIC: A UDP-Based Multiplexed and Secure Transport draft-ietf-quic-transport-22", QUIC, Jul. 9, 2019, 148 pages.
T. Eckert, Ed. et al., "A Framework for Signaling Flow Characteristics between Applications and the Network draft-eckert-intarea-flow-metadata-framework-02", Internet Engineering Task Force, Oct. 21, 2013, 18 pages.
Q. De Coninck et al., "Multipath Extensions for QUIC (MP-QUIC) draft-deconinck-quic-multipath-03", QUIC Working Group, Aug. 29, 2019, 32 pages.
Cisco, "Configuring AVC with DNS-AS", Cisco, Chapter 45, 24 pages.
Apple Inc., "CFStreamCreatePairWithSocketToHost(pullout;168 50081-z000026.eps)", Apple Inc., 2019, 4 pages, retrieved from Internet Nov. 6, 2019; https://developer.apple.com/documentation/corefoundation/1539739-cfstreamcreatepairwithsockettoho.
M. Welzl et al., "A Minimal Set of Transport Services for End Systems draft-ietf-taps-minset-11", TAPS, Sep. 27, 2018, 50 pages.
B. Trammell, Ed., "An Abstract Application Layer Interface to Transport Services draft-ietf-taps-interface-05", TAPS Working Group, Nov. 4, 2019, 64 pages.
B. Trammell, Ed., "An Abstract Application Layer Interface to Transport Services draft-ietf-taps-interface-04", TAPS Working Group, Jul. 8, 2019, 64 pages.
David C. Reeve, "A New Blueprint for Network QOS", Diss. University of Kent at Canterbury, Aug. 2003, 217 pages.
Cisco Systems, Inc., "Cisco Application Visibility and Control User Guide", Cisco Systems, Inc., Dec. 2018, 140 pages.
Cisco Live, "Done with SDN and Tired of Dealing with Snowflake Network Complexity? Change the Game with a Simple TXT String", Cisco Live, Nov. 22, 2015, 80 pages.
3GPP, 3rd Generation Partnership Project; Technical Specification Group Core Network and Terminals; Access Network Discovery and Selection Function (ANDSF) Management Object (MO) (Release 15), 3GPP TS 24.312 V15.0.0 (Jun. 2018), 394 pages.
3GPP, 3rd Generation Partnership Project; Technical Specification Group Core Network and Terminals; 5G System; Usage of the Unified Data Repository services for Subscription Data; Stage 3 (Release 16), 3GPP TS 29.505 V16.1.0 (Dec. 2019).

(56) References Cited

OTHER PUBLICATIONS

3GPP, 3rd Generation Partnership Project; Technical Specification Group Core Network and Terminals; 5G System; Unified Data Repository Services; Stage 3 (Release 16), 3GPP TS 29.504 V16.2 0 (Dec. 2019), 37 pages.

3GPP, 3rd Generation Partnership Project; Technical Specification Group Core Network and Terminals; 3GPP Evolved Packet System (EPS); Evolved General Packet Radio Service (GPRS) Tunnelling Protocol for Control plane (GTPv2-C); Stage 3 (Release 16), 3GPP TS 29.274 V16.1.0 (Sep. 2019), 76 pages.

3GPP, 3rd Generation Partnership Project; Technical Specification Group Core Network and Terminals; Representational State Transfer (REST) reference point between Application Function (AF) and Protocol Converter (PC) (Release 15), 3GPP TS 29.201 V15.0.0 (Sep. 2017), 36 pages.

3GPP, 3rd Generation Partnership Project; Technical Specification Group Core Network and Terminals; Mobile radio interface Layer 3 specification; Core network protocols; Stage 3 (Release 16), 3GPP TS 24.008 V16.2.0 (Sep. 2019).

3GPP, 3rd Generation Partnership Project; Technical Specification Group Services and System Aspects; Policy and charging control framework for the 5G System (5GS); Stage 2 (Release 16), 3GPP TS 23.503 V16.3.0 (Dec. 2019), 90 pages.

Omkar Dharmadhikari, "5G Link Aggregation with Multipath TCP (MPTCP)", CableLabs, Apr. 3, 2019, 18 pages; retrieved from Internet Aug. 13, 2019.

3GPP, 3rd Generation Partnership Project; Technical Specification Group Services and System Aspects; Procedures for the 5G System (5GS); Stage 2 (Release 16), 3GPP TS 23.502 V16.3.0 (Dec. 2019), 82 pages.

3GPP, 3rd Generation Partnership Project; Technical Specification Group Services and System Aspects; System architecture for the 5G System (5GS); Stage 2 (Release 16), 3GPP TS 23.501 V16.3.0 (Dec. 2019), 417 pages.

Eriksson Anders et al., "A DNS-based information-centric network architecture open to multiple protocols for transfer of data objects", 2018 21st Conference on Innovation in Clouds, Internet and Networks and Workshops (ICIN), IEEE, Feb. 19, 2018, 8 pages.

Wolfgang Riedel, "DNS-AS Done with SDN and Tired of Dealing with Snowflake Network Complexity? Change the Game with a Simple TXT String", Cisco Live, Nov. 22, 2015, 80 pages.

Alcatel-Lucent, "Dynamic DNS for Load Balancing", 3GPP Draft; S2-111713 Dynamic DNS, 3rd Generation Partnership Project (3GPP), vol. SA WG2, No. Bratislava, Apr. 6, 2011, 4 pages.

International Search Report and Written Opinion in counterpart International Application No. PCT/US2020/059648, dated Jan. 28, 2021, 19 pages.

3GPP, 3rd Generation Partnership Project; Technical Specification Group Core Network and Terminals; Interface between the Control Plane and the User Plane Nodes; Stage 3 (Release 16), Technical Specification, 3GPP TS 29.244 V16.3.1 (Apr. 2020), Apr. 2020, 297 pages.

Cheshire, et al., "DNS-Based Service Discovery," Internet Engineering Task Force (IETF), Request for Comments 6763, Category: Standards Track, Feb. 2013, 49 pages.

Gulbrandsen, et al., "A DNS RR for specifying the location of services (DNS SRV)," The Internet Society, Network Working Group, Request for Comments: 2782, Category: Standards Track, Feb. 2000, 12 pages.

* cited by examiner

FIG. 2A — 200

| ENTERPRISE AND APP PROVIDER ARE EQUAL | SOURCE AUTHORITATIVE (APPLICATION PROVIDER) | | | | |
|---|---|---|---|---|---|
| | | REQUIRED | PREFERRED | AVOID | PROHIBIT |
| SOURCE PROXY (ENTERPRISE) | REQUIRED | REQUIRED | REQUIRED | REQUIRED | CONFLICT |
| | PREFERRED | REQUIRED | REQUIRED | NEUTRAL | PROHIBIT |
| | AVOID | REQUIRED | NEUTRAL | AVOID | PROHIBIT |
| | PROHIBIT | CONFLICT | PROHIBIT | PROHIBIT | PROHIBIT |

FIG. 2B — 250

| ENTERPRISE TAKES PRECEDENCE | SOURCE AUTHORITATIVE (APPLICATION PROVIDER) | | | | |
|---|---|---|---|---|---|
| | | REQUIRED | PREFERRED | AVOID | PROHIBIT |
| SOURCE PROXY (ENTERPRISE) | REQUIRED | REQUIRED | REQUIRED | REQUIRED | REQUIRED |
| | PREFERRED | REQUIRED | PREFERRED | PREFERRED | PROHIBIT |
| | AVOID | REQUIRED | AVOID | AVOID | PROHIBIT |
| | PROHIBIT | PROHIBIT | PROHIBIT | PROHIBIT | PROHIBIT |

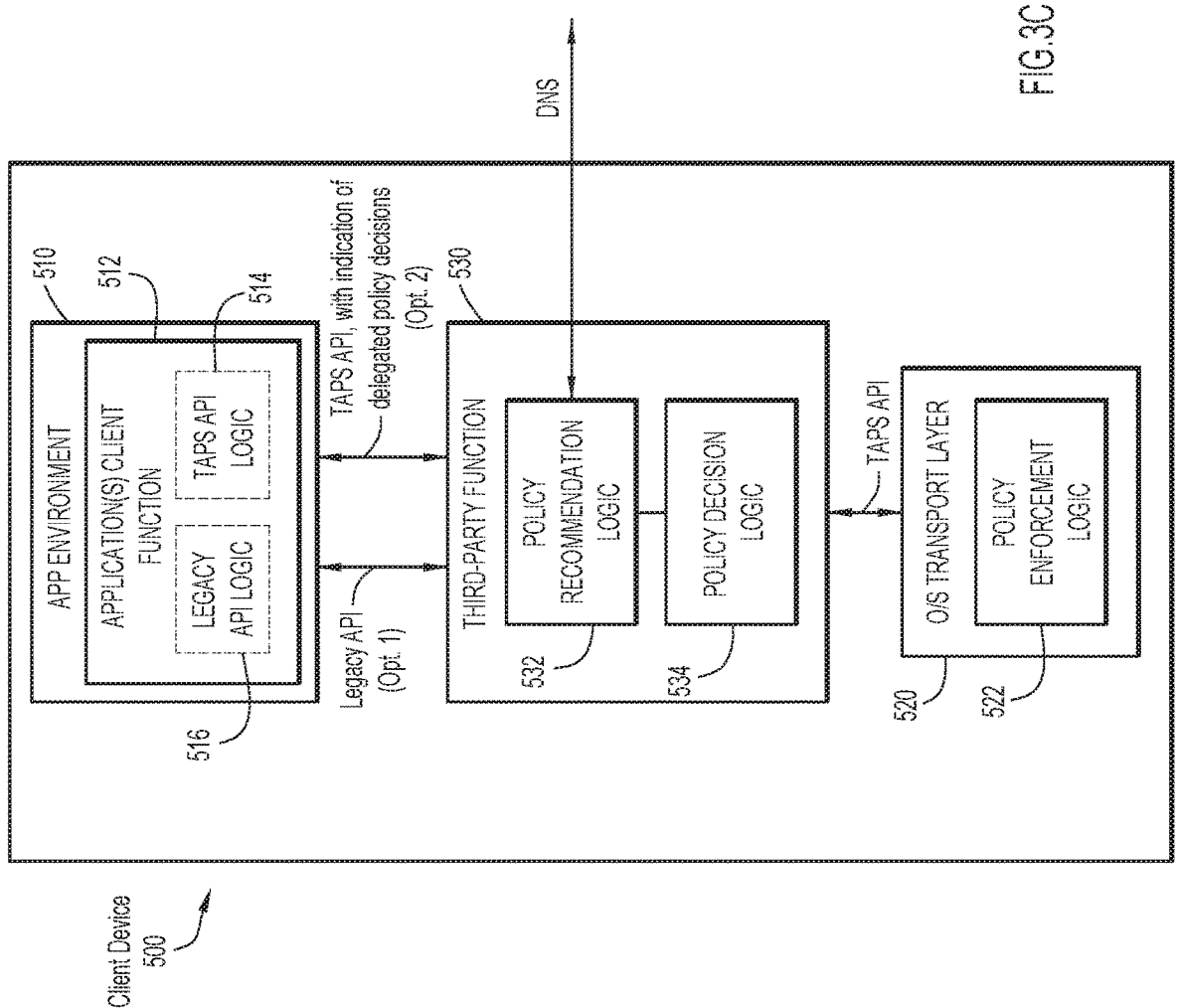

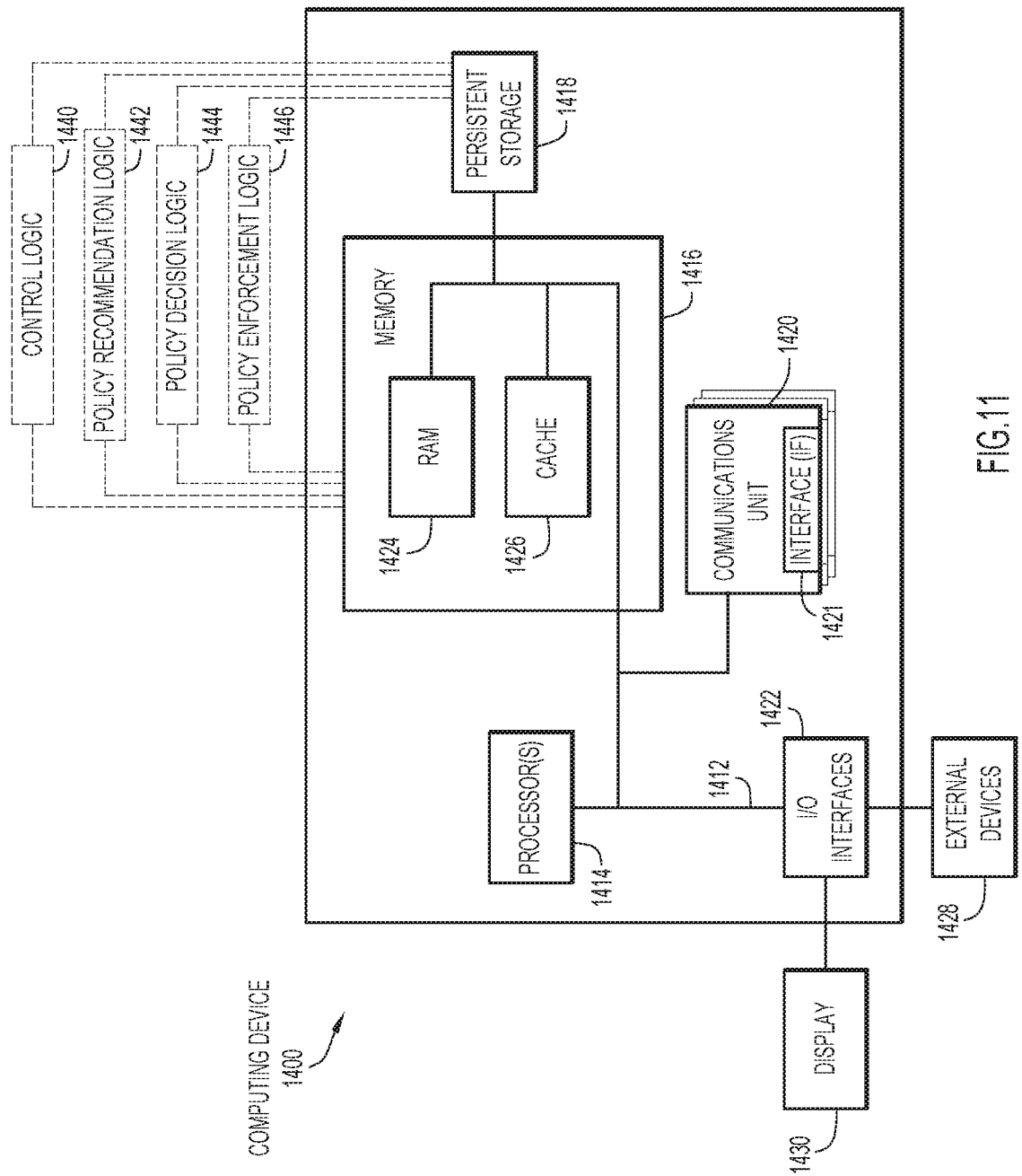

DOMAIN NAME SYSTEM AS AN AUTHORITATIVE SOURCE FOR MULTIPATH MOBILITY POLICY

CROSS-REFERENCE TO RELATED APPLICATION

This application claims the benefit of priority under 35 U.S.C. § 119 to U.S. Provisional Patent Application Ser. No. 62/935,727, entitled "DOMAIN NAME SYSTEM AS AN AUTHORITATIVE SOURCE FOR MULTIPATH MOBILITY," filed on Nov. 15, 2019, the disclosure of which application is hereby incorporated by reference in its entirety.

TECHNICAL FIELD

The present disclosure relates to network equipment and services.

BACKGROUND

Networking architectures have grown increasingly complex in communications environments, particularly mobile networking environments. Mobile communication networks have grown substantially in subscriber base as end users become increasingly connected to mobile network environments. As the number of mobile subscribers increases, efficient management of communication resources becomes more critical. In particular, there are significant challenges in managing multipath policies that may be utilized within mobile networking environments.

BRIEF DESCRIPTION OF THE DRAWINGS

FIGS. 2A and 2B are diagrams illustrating example details associated with combining multiple multipath (MP) policy recommendations to generate various multipath policy enforcement decisions, according to example embodiments.

FIGS. 3A, 3B, 3C, and 3D are block diagrams illustrating example details associated with different client device implementations that may be utilized to facilitate DNS-AS techniques discussed herein, according to various example embodiments.

FIG. 11 is a hardware block diagram of a computing device that may perform functions for providing multipath mobility according to DNS-AS techniques discussed herein.

DESCRIPTION OF EXAMPLE EMBODIMENTS

Overview

Figure 1:
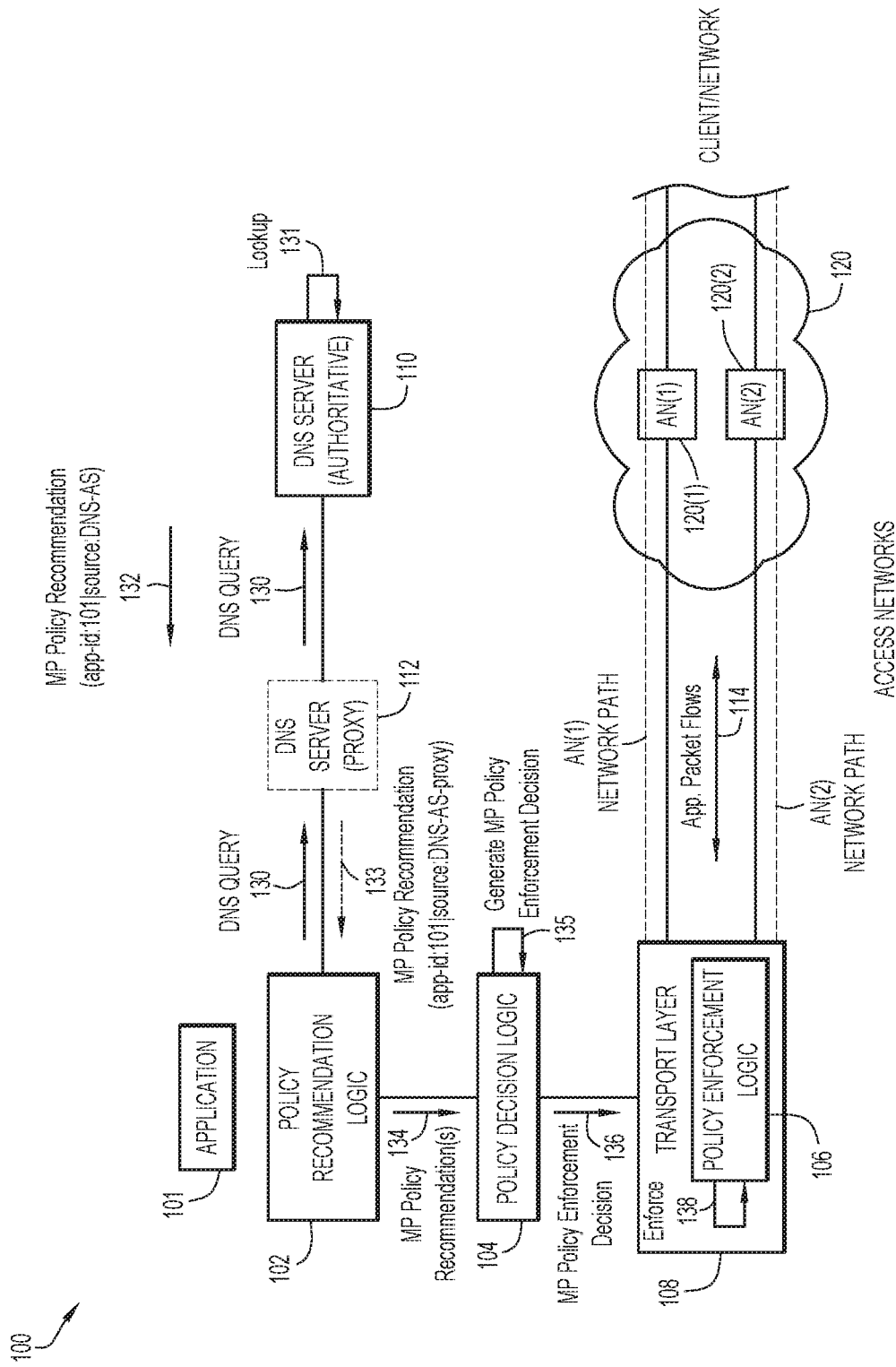
FIG. 1 is a block diagram illustrating features associated a system in which Domain Name System-as-an-Authoritative Source (DNS-AS) techniques may be utilized to facilitate multipath mobility, according to an example embodiment.

Techniques presented herein provide systems and methods that enables the definition of multipath (MP) policies for one or more applications and signaling multipath policies to one or more remote devices using enhanced Domain Name System-as-an-Authoritative Source (DNS-AS) techniques. In one embodiment, a remote client device may combine DNS-AS components (e.g., multipath policies, components of multipath policies, etc.) to affect multipath policy enforcement decisions for one or more packet flows of an application. In another embodiment, network functions may utilize DNS-AS techniques to affect multipath policy enforcement decisions within a network for one or more packet flows of an application.

In an example embodiment, a method is provided that may include obtaining, by a multipath policy decision element, a plurality of multipath policy recommendations for an application, wherein the plurality of multipath policy recommendations are obtained from one or more multipath policy recommendation elements; combining the plurality of multipath policy recommendations to generate a policy enforcement decision, wherein the policy enforcement decision identifies, at least in part, one or more network paths that are to be utilized for one or more packet flows associated with the application, wherein each of the one or more network paths is associated with an access type; and enforcing the policy enforcement decision for one or more packet flows associated with the application.

Example Embodiments

A network that includes multiple access technology types for multiple access networks is often referred to as a heterogeneous network (HetNet). Different access technology types can include wired accesses (e.g., Ethernet, etc.) and/or over-the-air Radio Frequency (RF) accesses (typically referred to as Radio Access Technology (RAT) types), which can include wireless local area network (WLAN) access types such as Wi-Fi®, cellular access network types such as Third (3rd) Generation Partnership Project (3GPP) accesses, among others.

In various implementations, it may be advantageous to discover policy information for applications as it relates to mobility and multipathing (e.g., multipath data transmissions) in a HetNet environment. In particular, it is anticipated that a (potentially significant) portion of applications may not be natively multipath (MP) enabled. For such applications, a system may deliver multipath proxy functionality. Whereas it is considered that a multipath enabled application may embed mobility and multipath policy into its operation, applications supported by multipath proxies may rely on the proxy to perform policy enforcement. What is needed is a technique to provide information about what may be involved to facilitate multipath operation for an application or one or more packet flows associated with the application (e.g., access network selection, path selection, multipath protocol to be utilized, bandwidth, throughput, etc.).

Presented herein are techniques to enable the definition of multipath policies for one or more application and signaling such multipath policies to one or more remote devices using enhanced DNS-AS techniques for HetNet environments. One or more remote device(s) may combine one or more multipath policies associated with a particular application to determine a multipath policy enforcement decision that can be enforced at a policy enforcement point, such as at the transport layer of a client device and/or of one or more user plane elements of a network, which may involve one or more services (e.g., access interfaces).

Generally, as referred to herein, a 'policy' can represent a collection of intent or goals, sometimes characterized as 'rules', through which application of the policy (e.g., rules of the policy) can be utilized to realize the intent or goals of the policy.

FIG. 1 is a block diagram illustrating features associated with a system 100 in which Domain Name System-as-an-Authoritative Source (DNS-AS) techniques may be utilized to facilitate multipath mobility, according to an example embodiment. In particular, system 100 illustrates features associated with various logic that may be implemented to facilitate DNS-AS techniques in accordance with embodiments described herein. Logic that may be implemented to facilitate DNS-AS techniques described herein may be configured for any combination of client devices and/or network devices for a system, as discussed in further detail herein with reference at least to FIGS. 3A-3D and, discussed below.

Returning to FIG. 1, in at least one embodiment, system 100 may include policy recommendation logic 102, policy decision logic 104, policy enforcement logic 106, and a DNS server 110 configured as an authoritative source (also referred to herein interchangeably as DNS authoritative server 110 or authoritative DNS server 110). Policy enforcement logic 106 may be configured for a transport layer 108 within system 100 (e.g., for any combination of client devices and/or user plane network elements). Also shown in FIG. 1 are access networks (ANs) 120 and an application 101. In some embodiments, a DNS server 112 configured as a non-authoritative or proxy source (also referred to herein interchangeably as DNS proxy server 112 or proxy DNS server 112) may be provided for system 100.

In at least one embodiment, policy recommendation logic 102 may interface with policy decision logic 104, which may further interface with transport layer 108/policy enforcement 106. Policy recommendation logic 102 may, depending on implementation, interface with DNS authoritative server 110 directly and/or indirectly (e.g., via DNS proxy server 112) and/or may interface with DNS proxy server 112. Transport layer 108 may further interface with access networks 120, which may facilitate interfaces with one or more client devices and/or networks. Although not illustrated in FIG. 1, consider that application 101 may be configured for a client device in system 100.

In various embodiments, applications (e.g., application 101) can include any type of application including, but not limited to business or enterprise applications (e.g., business video/teleconferencing applications, email communications), non-business/non-enterprise applications (e.g., social networking applications, shopping applications, etc.), etc.

System 100 may be associated with a HetNet architecture in which access networks (ANs) 120 may include any number of access networks such as a first access network AN(1) 120(1) and a second access network AN(2) 120(2). The access networks 120, which may be inclusive of Radio Access Networks (RANs) for one or more Radio Access Technology (RAT) types, may include any combination of with radios [sometimes referred to as access points, which may include any combination of hardware (e.g., communications units, receiver(s), transmitter(s), antenna(s) and/or antenna array(s), processor(s), memory element(s), baseband processor(s) (modems), etc.)], controllers (e.g., wireless local area network controllers, etc.), software, logic, and/or any other elements/entities that may facilitate access network connections for one or more elements of system 100. Radios/access points for ANs 120 may include any combination of 3G NodeBs, 4G/LTE evolved Node Bs (eNBs or eNodeBs), 5G/next generation NodeB (gNB or gNodeB), Wi-Fi® APs, and/or any other radio devices now known here or hereafter developed.

In various embodiments, ANs 120 may be any combination of licensed spectrum access networks, such as Third (3rd) Generation Partnership Project (3GPP) access networks (e.g., 4th Generation (4G)/Long Term Evolution (LTE), 5th Generation (5G), next Generation (nG), etc. access networks), unlicensed spectrum non-3GPP access networks (e.g., Institute of Electrical and Electronic Engineers (IEEE) 802.11 (Wi-Fi®), IEEE 802.16 (WiMAX®), Wireless Local Area Network (WLAN), etc. access networks), unlicensed spectrum 3GPP access networks (e.g., License Assisted Access (LAA), enhanced LAA (eLAA), etc. access networks), and/or the like. Wired access networks (e.g., Ethernet) can also be envisioned. Although only two access networks are illustrated in system 100, it is to be understood that any number of access networks may be present in a system in accordance with embodiments of the present disclosure.

Transport layer 108 may facilitate interfaces with access networks 120 (e.g., AN(1) 120(1) and AN(2) 120(2)) for communicating one or more packet flows 114 for application 101 to/from one or more clients (e.g., user equipment (UE)) and/or networks (e.g., mobile core networks, data networks, etc.). Packet flows 114 associated with data transfer for application 101 may be communicated (e.g., transmitted, routed, forwarded, etc.) along network paths associated with each access network 120. For example, an AN(1) network path may be associated with AN(1) 120(1) and an AN(2) network path may be associated with AN(2) 120(2) in which the network paths may include any number of devices (e.g., routers, switches, etc.) that may facilitate network communications. Packet flows associated with data transfer for an application may also be referred to herein interchangeably as application data flows.

One aspect of techniques herein may provide for the ability to augment metadata components for DNS Resource Records provisioned for DNS authoritative server 110 and DNS proxy server 112 (if implemented) in which DNS text (TXT) Resource Records associated with an application may be augmented with information, such as a DNS-AS entry, concerning multipath policy for the application, which may be utilized to provide one or more multipath policy recommendations to one or more elements of a network. Generally, operations associated with various DNS-AS techniques discussed herein may include recovering multipath (MP) data transfer policy recommendations or, more generally, multipath policy recommendations, for an application by one or more elements of a network (e.g., recovering via policy recommendation logic 102 implemented for one or more elements), generating a MP policy enforcement decision for the application based, at least in part on the recovered multipath policy recommendations (e.g., via policy decision logic 103), and enforcing the generated policy enforcement at the transport layer 108 (e.g., via policy enforcement logic 106). It is to be understood that these operations can be performed for any number of applications that may be identified in any number of DNS-TXT records for one or more domain(s).

As recovery of MP policy recommendations, MP policy enforcement decision generation, and policy enforcement may be performed for any combination and/or type of devices (e.g., client devices and/or network devices) within a system (e.g., system 100 and/or any other system discussed herein), it is to be understood that various configurations/types of policy recommendation logic 102, policy decision logic 104, and/or policy enforcement logic 106 may be configured for any combination, number, and/or type of devices that may be implemented for systems discussed herein.

Multipath policy recommendations may be recovered from a variety of sources, which may be implemented using a variety of techniques. For example, in at least one embodiment of FIG. 1, multipath policy recommendations for an application may be recovered from any combination policy recommendation servers such as any combination of DNS authoritative server 110 and/or DNS proxy server 112.

For DNS-AS techniques presented herein, a multipath policy or policy recommendation for an application, such as application 101, may be defined using metadata, which may be encoded into one or more DNS Resource Record(s), such as DNS text (TXT) Resource Record(s) (also referred to interchangeably herein as 'DNS-TXT records'). DNS metadata for a multipath policy can be consumed by the network (e.g., client devices, network functions, etc.).

In at least one instance, some metadata components of a DNS-TXT record used to signal MP policy recommendations may be structured in accordance with syntax formats as defined at least by Internet Engineering Task Force (IETF) Request For Comments (RFC) 6759. Other metadata components can be signaled in MP policy recommendations using other syntax elements/formats, such as for signaling multipath resilience information, business relevance information, class information, Transport Services (TAPS) properties/options, etc. as discussed for embodiments herein.

HetNet architectures may provide for defining a combined application and access security layer. For example, a business relevance component can be encoded into DNS-AS metadata to indicate whether an application is to receive additional security protection, further motivating a combined approach for handling security and mobility based on DNS-AS.

Consider an existing DNS Resource Record format, as follows:

HETNET=app-name:example|app-class:TD|business: YES|app-id:CU/28202

In various embodiments, an application or an application instance may be identified by an application identifier (APP-ID or app-id), which may include any combination of a name ('app-name' such as 'app-name:example', as above), number/value/etc. (e.g., 'app-id:CU/2802', as above) combinations thereof, and/or the like now known here or hereafter developed.

For enhanced DNS Resource Records that may be provided in accordance with techniques herein, a multipath syntax (mpath) may be encoded in Resource Records to identify different levels or types of resiliency that are to be provided for a particular example application when selecting one or more network path(s) for flow(s) associated with the application. In at least one embodiment, an enhanced DNS Resource Record format can be provided, as follows:

HETNET=app-name:example|app-class:TD|business:YES|app-id:CU/28202|mpath:RESIL

Various multipath syntaxes may be formatted as follows:
mpath:RESIL
mpath:AGG
mpath:RTT
mpath:NONE/mpath:NATIVE In one embodiment, techniques herein may facilitate utilizing a multipath proxy service or node hat may operate in a mode whereby a secondary path can be established for resiliency operation (e.g., an active path and one or more standby path(s)). In one instance, the syntax 'mpath:RESIL' can be used to indicate utilizing one active path and 'N' standby paths for communicating packet flows for an application.

In one instance, 'mpath:AGG' can be used to indicate aggregating all available paths together for communicating packet flows for an application. In still one instance, the syntax 'mpath:RTT' can be used to indicate utilizing a path that has the lowest delay/round trip time (RTT). In still one instance, the syntax 'mpath:NONE' or 'mpath:NATIVE' can be used to indicate that packet flows for an application are to be configured not to use multipath operations. Other variations can be envisioned. In one instance, DNS TXT resource records including DNS-AS multipath policy information can be populated for a proxy DNS server a multipath proxy server based on responses obtained by the proxy from an authoritative DNS server.

The multipath syntax may exclude definition of what type of paths are to be used to fulfil a particular multipath policy for packet flow(s) of an application. For example, a resilience policy could be enforced using two cellular connections using different mobile operators, a combination of Wi-Fi® and cellular connections, or even, if capabilities permit, two Wi-Fi® connections from different operators. In some instances, an application provider, or their proxy, may only interested in the outcome/enforcement of a policy (e.g., a resilient application experience), rather than how that is achieved from an access technology perspective. However, in other instances, an application provider may signal preferences for one or more access technologies within an MP policy recommendation, such as for a Transport Services (TAPS) implementation, as discussed in further detail for various embodiments herein.

Another aspect of techniques herein may provide for the ability to signal service class or application class information for different levels types of services that may be provided by applications. Service/application class information can be indicated using a syntax such as 'class:TYPE', 'app-class:TYPE', or any variations thereof, depending on the formatting utilized for a DNS-TXT record or any other MP policy recommendation.

For example, a syntax of 'class:VO' can be used to indicate that a MP policy recommendation for an application is associated with a Voice-over-IP (VoIP) telephony service. A syntax of 'class:BV' can be used to indicate that a MP policy recommendation for an application is associated with a broadcast video service. A syntax of 'class:RTI' can be used to indicate that a MP policy recommendation for an application is associated with a real-time interactive service. A syntax of 'class:MMC' can be used to indicate that a MP policy recommendation for an application is associated with a multi-media conferencing service. A syntax of 'class: MMS' can be used to indicate that a MP policy recommendation for an application is associated with a multi-media streaming service. A syntax of 'class:TD' can be used to indicate that a MP policy recommendation for an application is associated with a transactional data service. A syntax of 'class:BD' can be used to indicate that a MP policy recommendation for an application is associated with a bulk data service. A syntax of 'class:BE' can be used to indicate that a MP policy recommendation for an application is associated with a best effort service. A syntax of 'class:OAM' can be used to indicate that a MP policy recommendation for an application is associated with an operations, administration, and maintenance (OAM) service. A syntax of 'class:NC' can be used to indicate that a MP policy recommendation for an application is associated with a network control (NC) service. A syntax of 'class:CS' can be used to indicate that a MP policy recommendation for an application is associated with a signaling service. Other syntaxes for any other services now known here or hereafter developed can be envisioned in accordance with embodiments herein.

Any formats may be utilized for encoding an enhanced DNS Resource Record for indicating MP policy recommendations and/or for indicating application-based MP policy recommendations (discussed in further detail below with reference to Transport Services (TAPS) implementations). Thus, any syntaxes now known here or hereafter developed may be utilized to signal MP policy recommendations within a system. For example, in some embodiments, a Length Type Value (LTV) encoding can be provided for an enhanced DNS Resource Record format, as follows:

```
0x0b|hetnetver=1|0x09|src=proxy|0x1A|con-sel=avd:cell,pref:wifi|0x0A|rtt=req:50|0x07|
cap=htd|0x0D|rx-rate=5.5E5|0x0C|mpproto=hicn|
```

Consider other enhanced DNS Resource Record formats as follows:

```
hetnet|hetnetver=1|src=server|con-sel=pref:wifi|rtt=pref:50|cap=llni|tx-rate=1.0E6|rx-
rate=1.0E6|mpproto=hicn
hetnet|hetnetver=1|src=server|con-sel=pref:wifi,avd=cell|pvd=pref:unmetered|rtt=pref:20,
req:50|cap=llni|tx-rate=2.0E6|rx-rate=2.0E6|mpproto=hicn
```

As illustrated, the above example formats do not utilize a length field (e.g., 0x0b in the prior example).

Consider still another an enhanced DNS TXT Resource Record including DNS-AS multipath policy information, as follows:

```
HETNET=app-name:webex|app-class:MMC|business:YES|app-
    id:CU/28202|source:DNS-proxy|mpath:RESIL
```

Due to the business relevance as illustrated in the above example (e.g., business: YES), an active path may be set to be on the highest quality path in one example implementation.

Consider another example DNS TXT Resource Record including DNS-AS multipath policy information, as follows:

```
HETNET=app-name:socialnetworkapp|app-class:BE|business:NO|app-
    id:CU/28999|source:DNS-AS-proxy|mpath:RESIL
```

Due to no business relevance as illustrated in this example (e.g., business:NO), an active path may be on the lowest cost path in one example implementation.

Another aspect of techniques herein may include combining components within an enhanced DNS Resource Record. As illustrated in the previous two examples, a source syntax (source:) can be encoded within an enhanced DNS TXT Resource Record in combination with the multipath syntax in one embodiment. A source syntax may be used to indicate an origin of a multipath policy recommendation as originating from an authoritative policy recommendation source, such as DNS authoritative server 110, or from a non-authoritative policy recommendation source, such as DNS proxy server 112.

For example, in some implementations, a DNS authoritative source may be provisioned for a global network, such as an authoritative DNS source provisioned the Internet by an application provider, and a DNS proxy server may be provisioned for a local network, such as an enterprise network operated by an enterprise entity to serve enterprise purposes (e.g., business purposes, government purposes, educational/university purposes, etc.). In still some implementations, a local DNS authoritative source may be configured for a local network, which may be implemented in combination with any other DNS sources, as discussed herein In one example, a MP policy recommendation originating from an authoritative source may indicate such an origin using a syntax such as 'source:DNS-AS', 'src=DNS-AS', 'src:server', 'src=server' or any variations thereof, depending on the formatting utilize for a DNS-TXT record or any other MP policy recommendation. A MP policy recommendation originating from a non-authoritative source may indicate such an origin using a syntax such as 'source:DNS-proxy', 'src=DNS-proxy', 'source:DNS-AS-proxy', 'src:proxy', 'src=proxy', or any variations thereof, depending on the formatting utilized for a DNS-TXT record or any other MP policy recommendation.

In still some implementations, policy recommendation source may include local DNS authoritative sources that may be implemented for a local network (e.g., for an enterprise network) from which multipath policy recommendations for an application can be recovered. Other techniques may be utilized for recovering multipath policy recommendations for an application from a policy recommendation server.

Although not shown in FIG. 1, other MP policy origination servers can be envisioned, such as a local DNS authoritative source that may, for example, be provisioned within an enterprise network, whereas a cloud-based DNS proxy source and a global authoritative DNS source may also be provisioned outside the enterprise network. In at least one embodiment, a MP policy recommendation originating from a local DNS authoritative source may indicate such an origin using a syntax such as 'source:rpz', 'source=rpz', 'src=rpz' or any variations thereof, depending on the formatting utilized for a DNS-TXT record or any other policy recommendation.

Because an Internet Protocol (IP) address of a DNS server is included in the DNS query/request, policy can be configured on a per network/DNS server basis. Such functionality may be utilized in some embodiments to over-rule a default policy on a per-network basis. For example, perhaps a network is known to have a low security reputation. For such a network, a default security policy may be provisioned that enables a direct internet access security policy signalled from an application-based DNS authoritative source to be over-written with a more conservative policy when applications names are resolved using a local DNS authoritative source operating in such a network. Other features that may be associated with local DNS-AS techniques are discussed in further detail below with reference to FIG. 6.

In some embodiments for instances in which multiple policy recommendations may be recovered for an application, the multiple policy recommendations may be combined to generate a MP policy enforcement decision. MP policy enforcement decisions can be encoded in any syntax form, such as DNS-TXT record syntaxes, LTV syntaxes, Type Length Value (TLV) syntaxes, and/or the like now known here or hereafter developed in order to carry any information that may be recovered and/or generated from an combination DNS-TXT MP policy recommendations, application-based MP policy recommendations (e.g., for Transport Services (TAPS) implementations, as discussed herein below) Policy combining techniques are discussed in further detail below with reference to FIGS. 2A and 2B.

Yet another aspect of techniques herein may provide for the ability to enable the configuration of DNS-AS multipath policies or policy recommendations via a cloud service in which a default behavior for all unknown applications can be encoded in an enhanced DNS RR, in a format such as:
    Default:    app-class:BE|business:NO|source:DNS-AS-proxy|mpath:RESIL Yet another aspect of techniques herein may provide for the ability to signal security information for levels of security that are to be utilized for one or more packet flows of an application. For example, a syntax of 'security:tunnel' can be used to indicate that packet flow(s) of application flows are to be transported over tunnels/tunnel-based interfaces (e.g., where they can receive additional security processing after tunnel termination); whereas, a syntax of 'security:dia' can be used to indicate that packet flow(s) of an application can be routed directly towards an external data network, such as the Internet.

Importantly, DNS-AS per application security policy can be utilized to integrate with established mobile Software-Defined Wide Area Network (SD-WAN) security policies, which can be used to determine, once an application flow has been signalled as involving tunnel transport, which specific tunnel can actually be used to transport the application flows.

As noted above, during operation one or more multipath policy recommendations can be recovered for an application (e.g., application 101), which can be utilized to generate a MP policy enforcement decision, which can be enforced via the transport layer of system 100. Consider an operational example for FIG. 1 in which policy recommendation logic 102 may initiate a DNS query, as shown at 130, to DNS authoritative server 110. The DNS query 130 (also referred to as a DNS lookup) may be a TXT record query for a particular domain (e.g., www.example.com).

In one implementation, consider that DNS proxy server 112 is not configured within system 100. In such an implementation, DNS authoritative server 110 may receive the query 130, perform a look-up, as shown at 131, for one or more TXT records for the domain, and may respond with one or more MP policy recommendation(s), as shown at 132, which are obtained by policy recommendation logic. The MP policy recommendations 132 may include policy recommendations for multiple applications associated with the domain, default policy recommendations for applications that may not have specific policy recommendations, etc. Consider for the present example that the MP policy recommendation(s) include at least one MP policy recommendation for application 101 (app-id:101), which may include an origin indicator indicating the source of the policy recommendation is from an authoritative source (DNS authoritative server 110) using a syntax such as 'source: DNS-AS'. Other information may be encoded in the MP policy recommendation 132 for application 101 (e.g., a multipath syntax, Transport Services (TAPS) properties/options, etc. as discussed herein).

In this example, the MP policy recommendation 132 is obtained by policy decision logic 104, as shown at 134. The MP policy recommendation 132 may be obtained by policy decision logic 104 utilizing push or pull operations. Once the MP policy recommendation 132 is obtained by policy decision logic 104 for the present example, the policy decision logic 104 can generate a MP policy enforcement decision based on the MP policy recommendation for application 101, as shown 135. In addition to and/or in lieu of combining multiple multipath policy recommendations, generating a MP policy enforcement decision may include generating a domain specific configuration and/or translation from a given MP policy recommendation. In one instance, for example, a preferred (or required) latency for a MP policy recommendation might translate into a flow priority for a given domain that could be used to ensure that flow latency may remain low enough to meet the MP policy recommendation.

The MP policy enforcement decision can identify, at least in part, one or more network paths (e.g., any combination of AN(1) network path and/or AN(2) network path) that are to be utilized for one or more packet flows associated with the application 101 in which each of the one or more network paths is associated with an access type (e.g., AN(1) 120(1) and/or AN(2) 120(2)). A MP policy enforcement decision can identify other information, parameters, etc. for an application (e.g., multipath protocol to utilize for transmissions, Transport Services (TAPS) information, etc.), as discussed herein.

Once generated, the MP policy enforcement decision for application 101 is obtained by policy enforcement logic 106, as shown at 136 (e.g., using push and/or pull operations). The policy enforcement logic 106 enforces the MP policy enforcement decision for the transport layer 108, as shown at 138. In at least one embodiment, enforcing a policy decision for an application, such as application 101, can include selecting the one or more network paths for communicating the one or more packet flows associated with the application, such as application packet flows 114, and transmitting the one or more packet flows associated with the application via the one or more selected network paths.

Consider another example in which DNS proxy server 112 is implemented for system 100. In this example, DNS proxy server 112 may receive the DNS query 130 and may perform a look up (not shown) for the domain in order to respond with one or more MP policy recommendation(s) to policy recommendation logic 102, as shown at 133, which are obtained by policy recommendation logic 102. Consider for the present example that the MP policy recommendation(s) include at least one MP policy recommendation for application 101 (app-id:101), which may include an origin indicator indicating the source of the policy recommendation is from a non-authoritative source (DNS proxy server 112), such as 'source:DNS-AS-proxy). Other information may be encoded in the MP policy recommendation 133 for application 101 (e.g., a multipath syntax, syntaxes for TAPS related properties/options, a capacity profile, etc. as discussed herein).

Further for this example, DNS proxy server 112 may also forward the DNS query to the DNS authoritative server 110 and operations involving DNS authoritative server can also be performed, as discussed above, in which proxy recommendation logic 102 may also obtain MP policy recommendation 132.

In this example, the MP policy recommendation 132 and the MP policy recommendation 133 are both obtained by policy decision logic 104, at 134. Once the MP policy recommendation 132 and the MP policy recommendation 133 are obtained by policy decision logic 104 for the present example, the policy decision logic 104 can generate a MP policy enforcement decision at 135 by performing policy combining operations in which the MP policy recommendations 132/133 are combined. Once generated, the MP policy enforcement decision for application 101 is obtained by policy enforcement logic 106 at 136 and the policy enforcement logic 106 enforces the MP policy enforcement decision for the transport layer 108 at 138.

Accordingly, various DNS-AS techniques may be utilized to facilitate multipath mobility, as illustrated for the embodiment of FIG. 1, in which one or more access network(s)/network path(s) may be selected for communicating one or more packet flows for an application provided for a client (not shown in FIG. 1) within a HetNet architecture for a system. Other DNS-AS techniques are discussed for other examples embodiments provided herein, such as utilization of various Application Programming Interfaces (APIs), including a Transport Services (TAPS) API, as may be defined at least by IETF draft, https://tools.ietf.org/html/draft-ietf-taps-interface-04#ref-I-D.ietf-taps-arch and/or a policy API that may provide other techniques to facilitate multipath mobility for one or more clients/applications within a HetNet architecture for a system.

Thus, for additional embodiments discussed herein, it is to be understood that any instance(s) of policy recommendation logic, policy decision logic, and/or policy enforcement logic may be configured to perform DNS-AS techniques in combination with or in lieu of the DNS-AS techniques discussed in combination with FIG. 1.

Referring to FIGS. 2A and 2B, FIGS. 2A and 2B are diagrams illustrating example details (e.g., tables 200 and 250) associated with combining multiple MP policy recommendations to generate a MP policy enforcement decision, according to example embodiments.

In at least one embodiment, policy combining techniques for embodiments herein can be based on an extensible Access Control Markup Language (XACML) combining process, which can be extended to account for combining multiple multipath policies for an application in order to determine or generate a multipath policy enforcement decision that can be enforced by one or more multipath policy enforcement points/logic of a system (e.g., any instance(s) of policy enforcement logic 106 configured for a system).

In general, the conventional XACML policy combining process produces binary decisions such as: Permit (P), Deny (D), Not Applicable (NA), or Indeterminate (IND), which can be applied using various combining models such as 'Permit-Overrides', 'Deny-Overrides', 'Deny-Unless-Permit', as are generally understood in the art. Conventionally, the expression 'D>P>IND>NA' represents a Deny-Overrides combining algorithm in which Deny rules take precedence over Permit rules, which take precedence over Indeterminate rules, which take precedence over Indeterminate rules.

In at least one embodiment, a conventional XACML policy combining processes can be extended to DNS-TXT syntax elements such as a Preferred/Avoid/Required/Prohibited syntax elements (as may be defined for the TAPS API for identifying an application's requirements and preferences for transport/network path selection), which can be utilized by policy decision logic (such as any instance(s) of policy decision logic 104 configured for a system) to generate a combined MP policy enforcement decision.

In one instance, a Required preference may have an effect of indicating a selection of only protocols/paths providing a given property and failing otherwise; a Preferred preference may have an effect of indicating a preference for protocols/paths providing a given property and proceeding otherwise; an Avoid preference may have an effect of indicating a preference for protocols/paths not providing a given property and proceeding otherwise; and a Prohibited preference may have an effect of selecting only protocols/paths not providing a given property and failing otherwise.

In one example, consider that Required and Prohibited MP policy recommendations cannot be over-written while others can be combined based on whether policy recommendations may be ranked equal or whether some policy recommendations (e.g., based on source) may take precedence over other policy recommendations.

For example, referring to FIG. 2A, FIG. 2A is a table 200 illustrating example details associated with a combining process for combining a first policy recommendation 202 for an application in which the origin or source is an authoritative source (e.g., source:DNS-AS), which may be associated with an application provider, with a second policy recommendation 204 in which the origin or source is a non-authoritative source (e.g., source:DNS-AS-proxy), which may be implemented for an enterprise/enterprise network, in order to generate a combined MP policy or MP policy enforcement decision 210 for an implementation in which the MP policy recommendations for the enterprise and the application provider are ranked equal, according to an example embodiment.

In another example, referring to FIG. 2B, FIG. 2B is a table 250 illustrating example details associated with a combining process for combining a first policy recommendation 252 for an application in which the origin or source is an authoritative source (e.g., a DNS authoritative server in which source:DNS-AS), which may be associated with an application provider, with a second policy recommendation 254 in which the origin or source is a non-authoritative source (e.g., a DNS proxy server in which source:DNS-AS-proxy), which may be implemented for an enterprise/enterprise network, in order to generate a combined MP policy or MP policy enforcement decision 260 for an implementation in which the MP policy recommendation for the enterprise (from the DNS proxy server) takes precedence over the MP policy recommendation for the application provider (from the DNS authoritative source), according to an example embodiment.

These policy combination examples are only a few of the many types of combinations that may be performed to generate a policy enforcement decision. Other policy combinations can be envisioned.

For example, in some implementations, there may be MP policy recommendations that may be obtained from multiple, different authoritative sources. Consider an example in which a local authoritative source may be configured for a local enterprise network and another global authoritative source may be configured for/by an application provider. For embodiments involving MP policy recommendations obtained from different authoritative sources and/or proxy sources, the MP policy recommendations may be combined according to an ordered or otherwise ranked list of policy priority precedent (e.g., local-AS (or RPZ)>global AS>proxy).

In various embodiments, as illustrated at least in FIGS. 3A, 3B, 3C, 3D, and 4, one or more elements of a network may utilize DNS-AS techniques as presented herein to recover MP policy recommendations for one or more applications, generate a MP policy enforcement decision for an application, and enforce MP policy enforcement decisions for a HetNet architecture, according to various embodiments.

There are a variety of scenarios and approaches that can be utilized to facilitate integration with DNS-AS defined policy techniques, as discussed for embodiments herein. For legacy applications, which often follow the latest recommendations a device manufacturer's operating system (OS) to use Uniform Resource Location (URL) based Application Programming Interfaces (APIs), a DNS-AS based service can be implemented by a multipath-proxy client functionality. Such functionality may either be delivered as part of the client device's core foundation framework or from an installed multipath proxy function/logic. For applications which may have been enhanced with native multipath capabilities, the client device's APIs, which may explicitly allow an application to request a particular policy, can be enhanced to enable an application to delegate recovery and/or generation of a multipath policy that may be delivered using various DNS-AS techniques; thereby enabling the client device to take account of the client device's real-time context when enforcement the multipath policy.

FIGS. 3A, 3B, 3C, and 3D are block diagrams illustrating example details associated with different client device implementations that may facilitate recovering one or more MP policy recommendations for an application, generating a MP policy enforcement decision, and enforcing the MP policy enforcement decision for one or more packet flows associated with the application in accordance with DNS-AS techniques provided herein, according to various example embodiments.

Figure 3A:
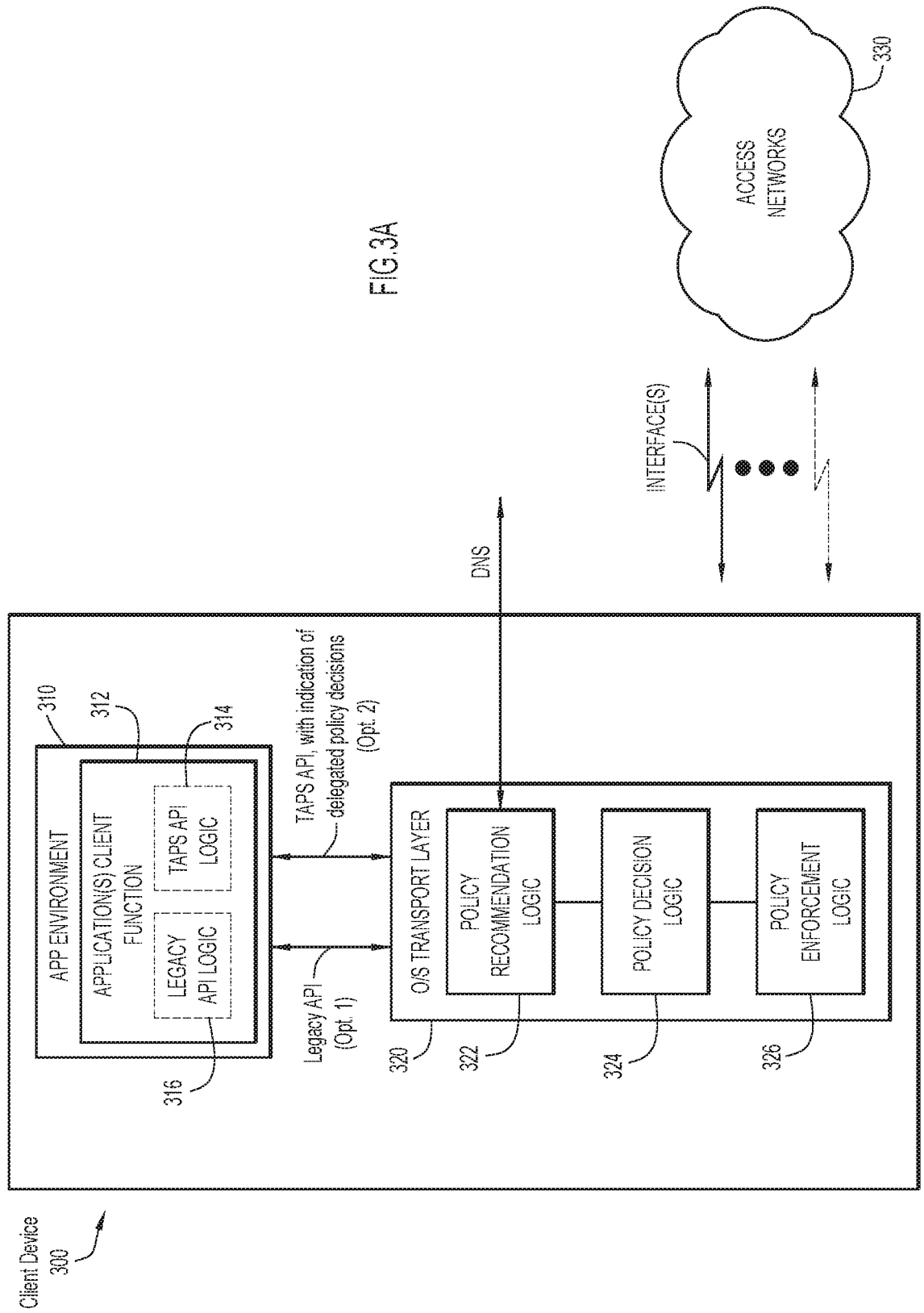

Referring to FIG. 3A, FIG. 3A includes a client device 300 (e.g., a UE, Internet host, etc.) in which an application (APP) environment 310 (logic, functions, etc.) and an OS/transport layer 320 are configured for client device 300. Also shown in FIG. 3A are access networks 330. APP environment 310 and OS/transport layer may interface utilizing various techniques, as discussed in further detail below.

APP environment 310 may be configured with one or more application(s) via an application(s) client function 312. OS/transport layer 320 may be configured with policy recommendation logic 322, policy decision logic 324, and policy enforcement logic 326.

Client device 300 may interface with access networks 330 via over-the-air Radio Frequency (RF) connections. For example, client device 300 may be configured with hardware (e.g., communications units, receiver(s), transmitter(s), antenna(s) and/or antenna arrays, processor(s), memory element(s), baseband processor(s) (modems), etc.)], software, logic, and/or the like (e.g., a 4G cellular communications unit, a 5G cellular communications unit, a Wi-Fi® communications unit, etc.) to facilitate any combination of one or more over-the-air interface(s) for accessing the access networks 330. In some implementations, client device may be configured with wired hardware, software, logic, and/or the like to facilitate any combination of one or more wired connection(s) with access networks 330, which may, in some instances, be performed in combination with any over-the-air RF connections with access networks 330.

In various embodiments, client devices discussed herein (such as client device 300 of FIG. 3A, client device 400 of FIG. 3B, client device 500 of FIG. 3C, client device 600 of FIG. 3D, and/or any other client devices discussed herein) may be associated with any electronic device, user equipment (UE), machine, robot, etc. wishing to initiate a flow in a system (e.g., system 100 of FIG. 1 and/or any other systems discussed herein). The terms 'device', 'electronic device', 'automation device', 'computing device', 'machine', 'robot', 'client', 'client device', and variations thereof are inclusive of devices used to initiate a communication, such as a computer, a vehicle and/or any other transportation related device having electronic devices configured thereon, an automation device, an enterprise device, an appliance, an Internet of Things (IoT) device, etc., a personal digital assistant (PDA), a laptop or electronic notebook, a desktop computer, a cellular telephone, a smart phone, an Internet Protocol (IP) phone, any other device and/or combination of devices, component, element, and/or object capable of initiating voice, audio, video, media, or data exchanges within a system. Client devices discussed herein may also be inclusive of a suitable interface to a human user such as a microphone, a display, a keyboard, or other terminal equipment. Client devices discussed herein may also be any device that seeks to initiate a communication on behalf of another entity or element such as a program, a database, or any other component, device, element, or object capable of initiating an exchange within a system. It is to be understood that any number of client devices may be present in a system.

One aspect of techniques herein may provide for an enhanced client API that is capable of indicating that a multipath policy recommendation associated with a multipath service is to be recovered dynamically from DNS-AS. In at least one embodiment, a client API may be implemented as a Transport Services (TAPS) API, as may be defined at least by IETF draft https://tools.ietf.org/html/draft-ietf-taps-interface-04#ref-I-D.ietf-taps-arch. In general, the Transport Services architecture defines a model for exposing transport protocol features to applications, which allows applications to utilize such protocol features flexibly for network communications (e.g., application packet flows).

In at least one embodiment, a TAPS API may be configured for client device 300 via TAPS API logic 314 to provide MP policy recommendations including TAPS related properties/options, as discussed below, for one or more multipath enabled application(s) that may be provided for client device 300. In some embodiments, TAPS API logic 314 may also be utilized to generate MP policy enforcement decisions and/or enforce one or more MP policy enforcement decisions. In still some embodiments, TAPS API logic 314 may be utilized to delegate MP policy enforcement decision generation and/or enforcement of MP policy enforcement decisions to other logic (e.g., logic of OS/transport layer 320, as discussed below).

Below is an example format, for a MP policy recommendation that may be provided for a TAPS API implementation:

|0x0b|hetnetver=1|0x09|src=proxy|0x1A|con-sel=avd: cell,pref:wifi|0x0A|rtt=req:50|0x07|cap=htd|0x0D|rx-rate=5.5E5|0x0C|mpproto=hicn|

The TAPS API may provide for the definition of selection properties that may consist of options (also referred to herein interchangeably as properties/options) that an application can set to influence the selection of paths between local systems (e.g., enterprise systems) and remote systems (e.g., cloud systems, third-party systems, 3GPP mobile core systems, etc.), to influence the selection of transport protocols, and/or to configure the behavior of generic transport protocol features. In some discussions herein, a MP policy recommendation that may be provided for a TAPS API implementation may be referred to as a referred to herein as a TAPS MP policy recommendation.

As noted above, properties/options can take the form of preferences (a Preferred preference, which can be indicated using a 'pref' syntax), avoidances (an Avoid preference, which can be indicated using a 'avd' syntax), requirements (a Required preference, which can be indicated using a 'req' syntax), or prohibitions (a Prohibit preference, which can be indicated using a 'prhb' syntax). In some instances, an Ignore preference may be indicated using a 'ign' syntax. Examples of options that influence path selection may include interface type (such as a wired Ethernet connection or a cellular LTE connection, etc.), recommendations involving a Maximum Transmission Unit (MTU) size or path MTU (PMTU), preferences for throughput and latency properties, among others.

Examples of options that influence protocol selection and configuration of transport protocol features may include reliability, service class, multipath support, and/or fast open support. Examples of transport protocols (identified in the above TAPS MP policy recommendation example using the syntax 'mpproto:hicn') may include MP for QUIC (MP-QUIC), MP Transport Control Protocol (MP-TCP or MPTCP), MP Real-time Transport Protocol (MPRTP), Stream Control Transmission Protocol (SCTP), a Hybrid Information-Centric Networking (hICN) protocol among others. A syntax of 'mpproto:none' can be used to indicate that no multipath protocol is preferred for an application.

For the TAPS API, a Preconnection Object can hold properties/options reflecting an application's requirements and preferences for the transport, which can include Selection Properties for selecting protocol stacks and paths, as well as Connection properties/options for configuration of the detailed operation of the selected Protocol Stacks. The protocol(s) and path(s) selected as candidates during connection establishment for the application can be determined and configured using these properties. For example, in the the above TAPS MP policy recommendation example a connection selection (con-sel) preference is provided that indicates avoiding cellular and preferring Wi-Fi® using the syntax 'con-sel=avd:cell,pref:wifi'. Further a RTT preference can be indicated (in milliseconds, for example) using the syntax 'rtt=req:50' indicating a maximum required RTT of 50 milliseconds.

A TAPS API 'Set' property/option, which can have a syntax of 'set(preference, enumeration)' can allow an application to select with specific network interfaces or categories of interfaces it desires to set to Preferred/Avoid/Required/Prohibited. A set of valid interface types may be implementation- and/or system-specific. For example, on a mobile client device, there may be Wi-Fi® and cellular interface types available; whereas on a desktop computer client device, there may be Wi-Fi® and wired Ethernet interface types available. Any combination of interface types can be envisioned for embodiments herein.

Generally, interface types are not intended to be treated as a proxy for properties/options of interfaces such as metered or unmetered network access. If an application is to prohibit metered interfaces, this may be specified via Provisioning Domain (PvD) attributes or another specific property. A Provisioning Domain, as defined at least by RFC 7556, may provide a framework in which Provisioning Domains define consistent sets of network properties that may be more specific than network interfaces.

Similar to interface instances and types, a Provisioning Domain Instance or Type property/option may allow an application to control path selection by identifying and/or selecting which specific Provisioning Domains or categories of Provisioning Domains it intends set to Preferred/Avoid/Required/Prohibited. The identification of a specific Provisioning Domain (PvD) may be implementation- and/or system-specific, since there may not be a portable standard format for a PvD identifier. Categories or types of PvDs may also be defined to be implementation- and system-specific.

Another TAPS API property/option may include a property for identifying parallel use of multiple paths. In one example, this property may provide for the ability to specify whether an application considers it useful to transfer data across multiple paths between the same end hosts. Generally, in most cases, this can improve performance (e.g., achieve greater throughput). One possible side-effect is increased jitter, which may be problematic for delay-sensitive applications. Thus, a recommended default for this option may be is to Prefer this option.

Examples of Connection properties/options can include a capacity profile, bounds on transmit/send (tx) and/or receive (rx) rates, among others. A capacity profile property/option may be utilized to specify a desired network treatment for traffic sent by an application and the trade-offs the application is prepared to make in path and protocol selection to receive that desired treatment. Various capacity options may include, for example, Default (which can be indicated using a 'def' syntax), Scavenger (which can be indicated using a 'scav' syntax), low latency-interactive (which can be indicated using a 'lli' syntax), low latency-non interactive (which can be indicated using a 'lni' syntax), constant rate streaming (which can be indicated using a 'const' syntax), high throughput data (HTD, which can be indicated using a 'htd' syntax), among others. For example, in the the above TAPS MP policy recommendation example a capacity profile corresponding to is HTD is identified using the syntax 'cap=htd'. During operation, when a capacity profile is set to a value other than Default, the transport system (e.g., OS/transport layer 320 via policy enforcement logic 326) is to select paths and profiles to optimize for the capacity profile specified.

Examples of bound properties/options may include minimum transmit (Tx) or send rate (which can be indicated in bits per second (bpts) using a 'tx-rate' syntax), minimum receive (Rx) rate (which can be indicated using a 'rx-rate' syntax), maximum send rate (which can be indicated using a 'max-send-rate' syntax)/maximum receive rate (which can be indicated using a 'max-recv-rate' syntax or 'Type: Numeric/Numeric Default' syntax in which values of (−1/−1) can indicate unlimited rates for both send/receive rates). For example, in the the above TAPS MP policy recommendation example a minimum receive rate is identified using the syntax 'rx-rate=5.5E5'.

In some implementations, one or more MP policy recommendations (DNS-TXT records) may be recovered by the OS/transport layer 320 of client device 300 via policy recommendation logic 322 via a DNS-TXT record query and one or more responses resulting therefrom. A MP policy enforcement decision can be generated by policy decision logic 324 and may be enforced via policy enforcement logic 326. A MP policy enforcement decision may be enforced by client device 300 through selection of one or more one or more interface(s) (e.g., any combination of a radio configured for a 4G cellular communications unit, a radio configured for a 5G cellular communications unit, a Wi-Fi® radio for a Wi-Fi® communications unit, a wired communications unit, etc.) for client device 300 for communicating with any combination of access networks 330 for one or more packet flows to be transmitted by client device 300 for one or more applications. Various potential communications units that may be configured for a device are illustrated below with reference to FIG. 11.

Multiple MP policy recommendations (DNS-TXT records) may be recovered from one query. For example, for a single DNS-TXT query for a given domain (e.g., www.example.com) can result in one or more recommendation(s) recovered from a DNS-AS and another from a DNS authoritative server (e.g., DNS authoritative server 110) and a DNS proxy server (e.g., DNS proxy server 112).

In still some implementations, application(s) operating via application(s) client function 312 may indicate MP policy recommendation(s) to the OS/transport layer 320 for various operations including, at least enforcement, to be performed by the OS/transport layer 320.

For example, in one embodiment, a first option (Opt. 1) may include an application utilizing legacy API logic 316 (e.g., Uniform Resource Locator (URL) Session API, etc.) to indicate application-based MP policy recommendations for the application to the OS/transport layer 320. For MP policy recommendations coming from an application provider, whether coming from a client (e.g., application and/or TAPs logic) or from an application provider DNS server (e.g., DNS server 110) the origin indicator may be set to authoritative. The OS/transport layer 320 may generate a MP policy enforcement decision using the application-based MP policy recommendations the DNS-TXT recovered MP policy recommendations to via policy decision logic 324 and may enforce the MP policy enforcement decision via policy enforcement logic 326.

In another embodiment, a second option (Opt. 2) may include utilizing the TAPS API facilitated via TAPS API logic 314 to indicate application-based MP policy recommendations (using any combination of TAPS API properties/options) for the application to the OS/transport layer 320, along with an indication that MP policy decisions for the application are being delegated to the OS/transport layer 320 (to be performed via policy decision logic 324).

During operation, in at one embodiment, combining MP policy recommendations in accordance with the TAPS API can be performed as discussed above utilizing the Preferred/Avoid/Required/Prohibited properties in which Required and Prohibited MP policy recommendations cannot be overwritten while others can be combined based on whether policy recommendations may be ranked equal or whether some policy recommendations (e.g., based on source) may take precedence over other policy recommendations.

For example, the OS/transport layer 320, via policy decision logic 324, may combine MP policy recommendations by excluding all protocols and paths that match a Prohibit, then exclude all protocols and paths that do not match a Require, then sort candidates according to Preferred properties, and then use Avoided properties as a tiebreaker. Selection Properties which select paths may be afforded a preference over those which select protocols. For example, if an application indicates a preference for a specific path by specifying an interface, but also a preference for a protocol not available on the specific path, the policy decision logic 324 may try the path first, ignoring the preference.

Accordingly, client device 300 of FIG. 3A may represent a default model for legacy or non-multipath enabled applications for communicating MP policy recommendations to policy decision logic via a legacy AP and may also represent an enhanced model that can be utilized with multipath enabled application for communicating MP policy recommendations and/or any combination of other delegated information, parameters, etc. via a multipath API logic, such as the TAPS API logic.

Figure 3B:
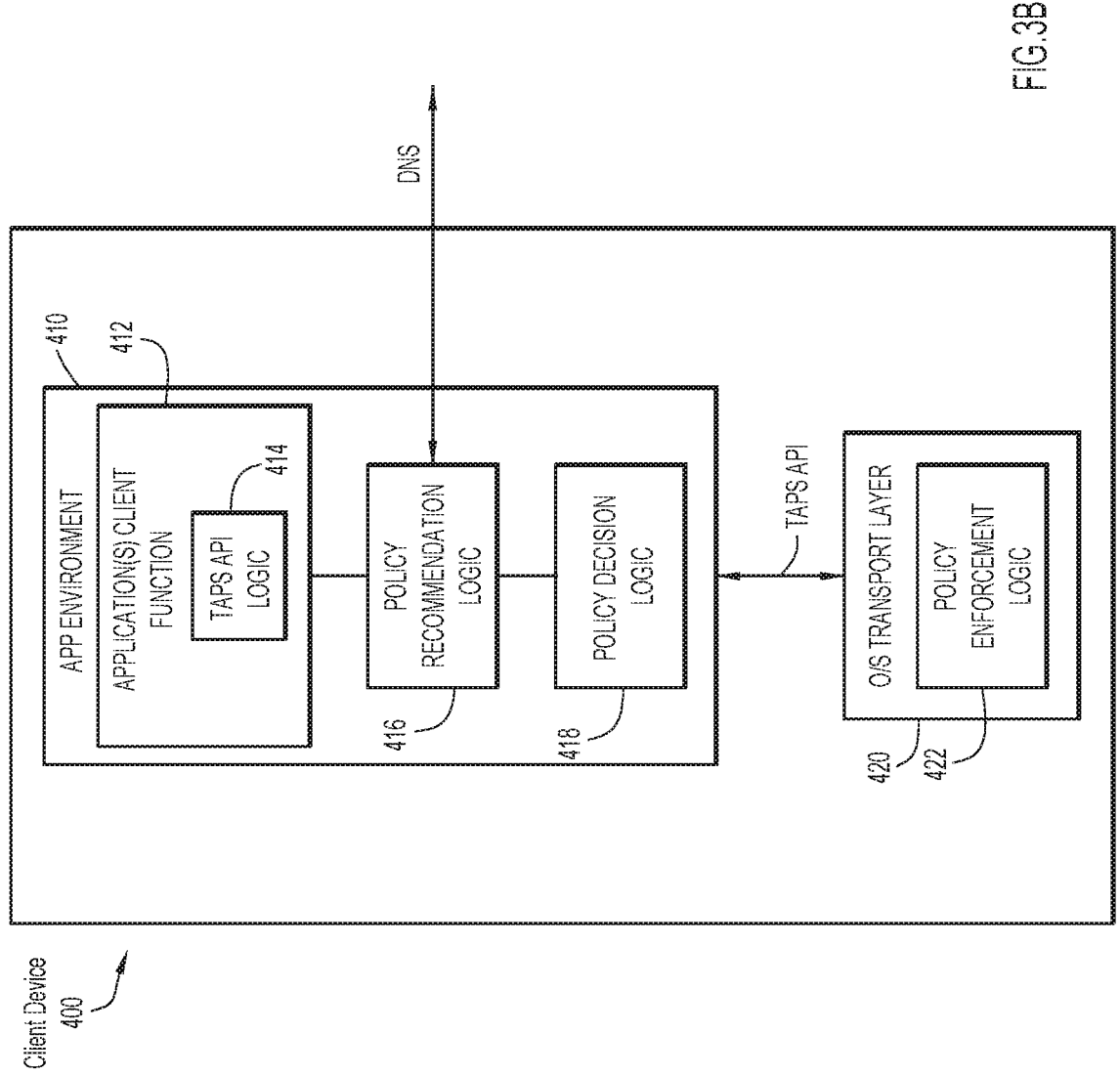

Referring to FIG. 3B, FIG. 3B includes a client device 400 in which an application (APP) environment 410 and an OS/transport layer 420 are configured for client device 400. Access networks are not illustrated in FIG. 3B for purposes of brevity only.

For the embodiment of FIG. 3B, client device 400 may represent a multipath aware client in which APP environment 410 is configured with one or more applications via an application(s) client function 412 that is configured with TAPS API logic 414. APP environment 410 may further be configured with policy recommendation logic 416 and policy decision logic 418 and OS/transport layer 420 may be configured with policy enforcement logic 422. APP environment 310 and OS/transport layer may interface via a TAPS API.

For the embodiment of FIG. 3B, client device 400 can recover different DNS-AS MP policy recommendations within the APP environment 410 via policy recommendation logic 416 and application-based MP policy recommendations can be provided via TAPS API logic 414 utilizing any techniques discussed herein. A MP policy enforcement decision can be generated within the APP environment 410 via policy decision logic 418 utilizing any techniques discussed herein in which the MP policy enforcement decision is obtained by policy enforcement logic 422 of the OS/transport layer 420 via a TAPS API for enforcement via the policy enforcement logic 422. Thus, for the embodiment of FIG. 3B, application(s) may be responsible for recovering MP policy recommendations and using the TAPS API to configure enforcement for client device 400.

Referring to FIG. 3C, FIG. 3C includes a client device 500 in which an application (APP) environment 510, an OS/transport layer 520, and a third-party function 530 are configured for client device 500. Access networks are not illustrated in FIG. 3C for purposes of brevity only.

For the embodiment of FIG. 3C, APP environment 510 is configured with one or more application(s) via an application(s) client function 512. In various embodiments, any combination of TAPS API logic 514 and/or legacy API logic 516 for the one or more application(s) and OS/transport layer 520 may be configured policy enforcement logic 522. Further for the embodiment of FIG. 3C, third-party function 530 may be configured with policy recommendation logic 532 and policy decision logic 534.

The APP environment 510 may interface with the third-party function 530 via any combination of a legacy API (Opt. 1, as discussed above) and/or a TAPS API with an indication of delegated policy decisions (Opt. 2, as discussed above) and third-party function 530 may further interface with the OS/transport layer 520 via a TAPS API or any other API that supports characteristics of a TAPS API.

Thus, as illustrated for client device 500 in the embodiment of FIG. 3C, different MP policy recommendations may be recovered by the third-party function 530 via policy recommendation logic 532 and a MP policy enforcement decision may be generated via policy decision logic 534 while the MP policy enforcement decision may be enforced at the OS/transport layer 520 via policy enforcement logic 522 of a client device 500.

In various embodiments, a third-party function, such as third-party function 530, may be a Cisco® AnyConnect® or a mobile Software-Defined Wide Area Network (SD-WAN) function that recovers MP policy recommendation(s) and generates a policy enforcement decision. Cisco® and AnyConnect® are registered trademarks of Cisco Technology, Inc. In one instance, a third-party function may be utilized to facilitate multi-vendor support, such as for a Mobile Device Manager or for a VPN connection, such as an AnyConnect® Client.

Figure 3D:
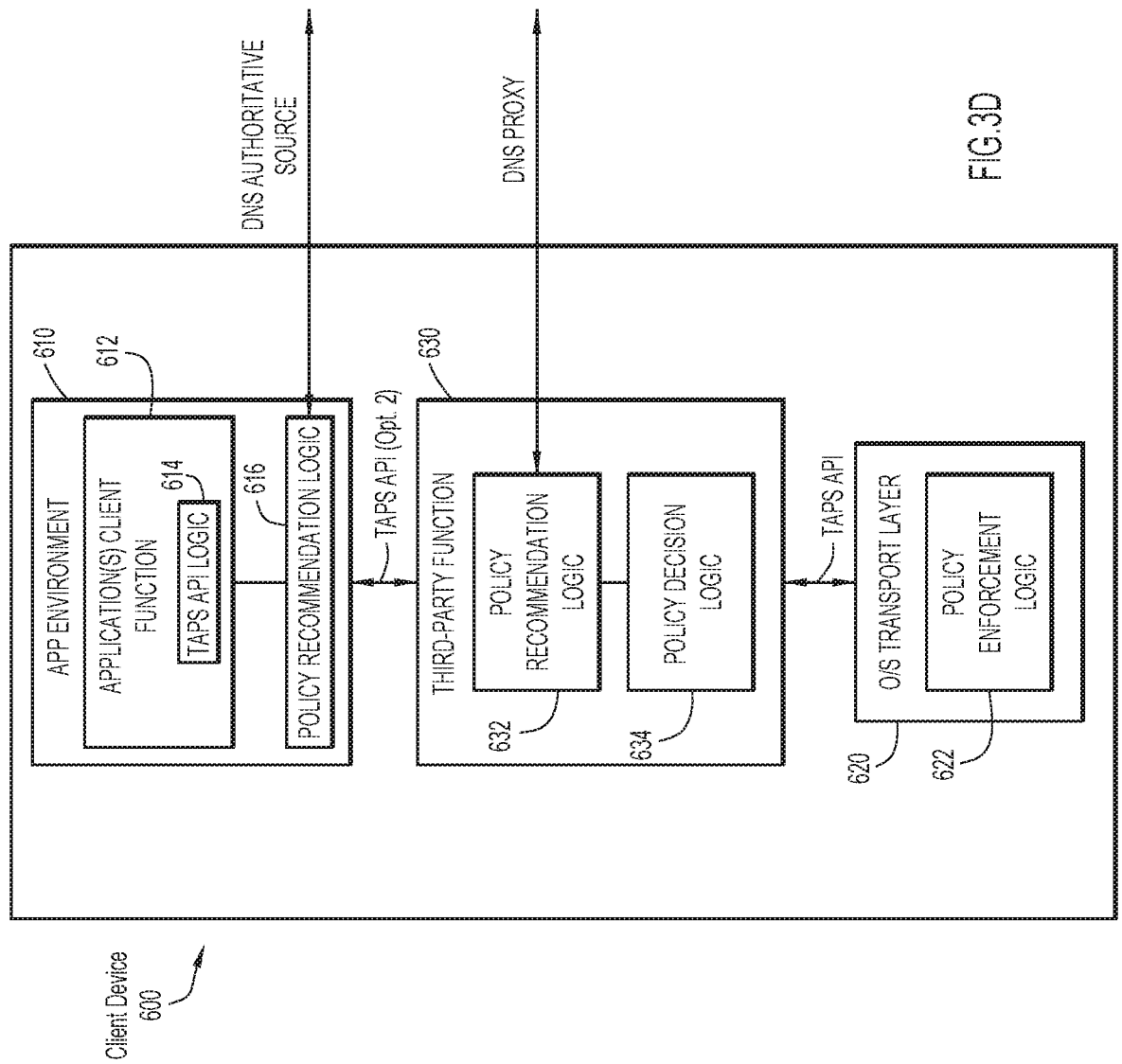

Referring to FIG. 3D, FIG. 3D includes a client device 600 in which an application (APP) environment 610, an OS/transport layer 620, and a third-party function 630 are configured for client device 600. Access networks are not illustrated in FIG. 3D for purposes of brevity only.

For the embodiment of FIG. 3D, APP environment 610 is configured with one or more application(s) via an application(s) client function 612, which includes TAPS API logic 614. APP environment 610 is also configured with policy recommendation logic 616. Third-party function 630 may also be configured with policy recommendation logic 632 and policy decision logic 634. Further, OS/transport layer 620 may be configured policy enforcement logic 622.

The APP environment 610 may interface with the third-party function 630 via a TAPS API with an indication of delegated policy decisions (Opt. 2, as discussed above) and third-party function 630 may further interface with the OS/transport layer 620 via a TAPS API.

As illustrated for client device 600 in the embodiment of FIG. 3D, a client application for client device 600 may recover, via policy recommendation logic 616, DNS authoritative source MP policy recommendations based on its application ID (APP-ID), thereby utilizing DNS-TXT records based on its APP-ID (e.g., it is not interested in an DNS A (IPv4 address) Resource Record or a DNS AAAA (IPv6 address) Resource Record). In this example, the client application could signal its URL to the third-party function 630, which can query for the A/AAAA and TXT records (or just another DNS-TXT record, dependent on the API) from a DNS proxy source via policy recommendation logic 632. If it is a conventional socket API then the third-party function 630 may retrieve the A/AAAA record for generating the IP address, otherwise, the third-party function 630 can proxy the URL on to the API to the transport layer which can then obtain the A/AAAA record with the IP address. Thus, the client device 600 illustrated in FIG. 3D may represent an embodiment involving split MP policy recommendations with an application utilizing an authoritative source and a third party recovering proxy recommendations.

As illustrated for the embodiments of FIGS. 3A, 3B, 3C, and 3D, a client device may represent a multipath policy decision element that may recover MP policy recommendations from one or more policy recommendation elements (e.g., a DNS authoritative source, a DNS proxy, and/or TAPS API logic) for one or more applications configured thereon, generate a MP policy enforcement decision for an application, and enforce the MP policy enforcement decision for one or more packet flow(s) associated with the application that are to be transmitted to one or more access networks (e.g., utilizing one or more uplink transmissions).

In at least one embodiment, enforcing a MP policy enforcement decision may include various operations such as, for example, identifying a particular packet/application packet flow as matching a MP policy enforcement decision/decision rule, selecting one or more interface(s), such as one or more radio(s) configured for one or more communications unit(s) of the client device associated with one or more access type(s) for one or more corresponding access network(s)/network connection(s) identified by the particular MP policy enforcement decision/decision rule, and causing packets associated with the application packet flow(s) to be transmitted using the selected interface(s).

Figure 4:
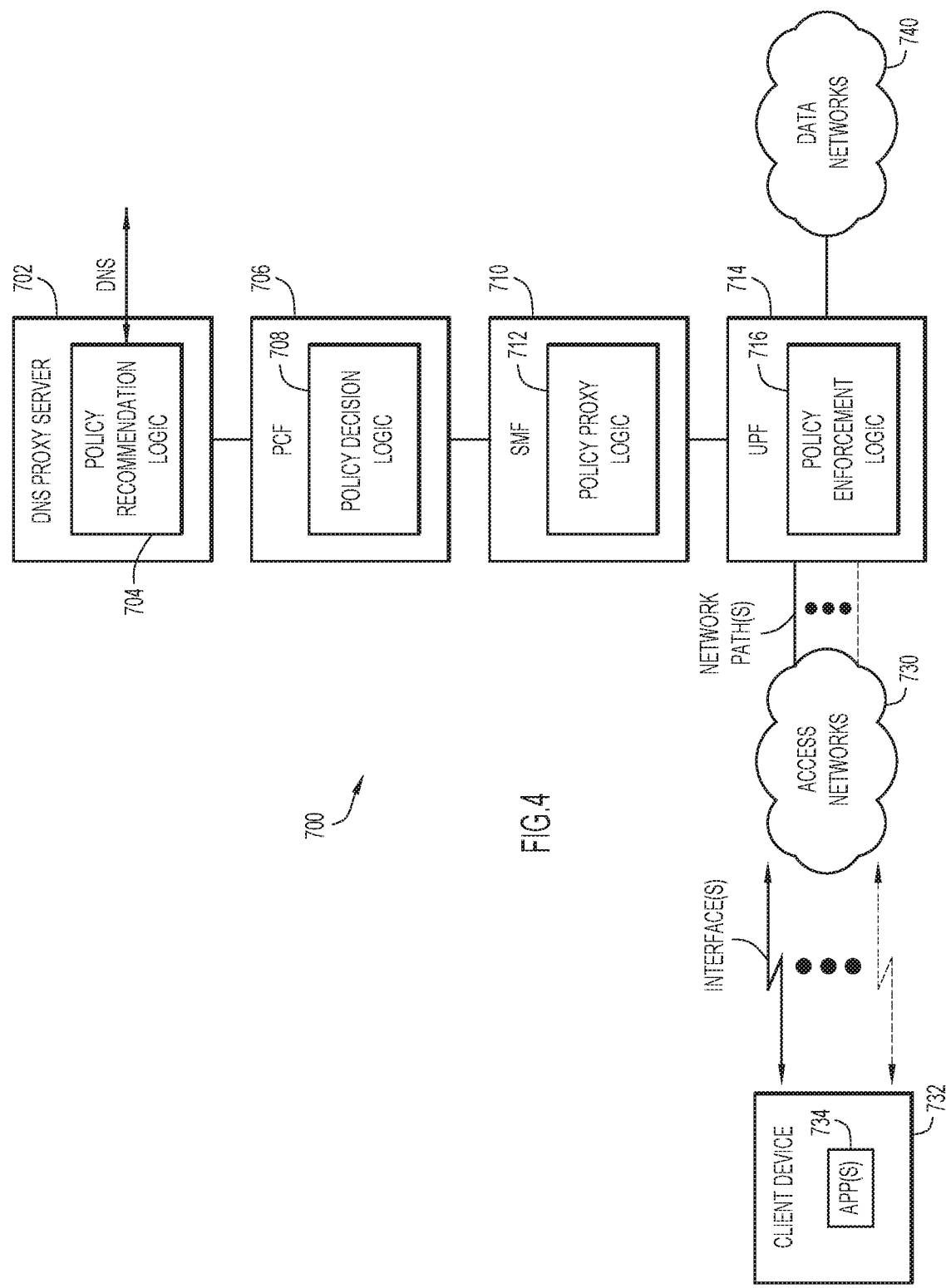
FIG. 4 is a block diagram illustrating example details associated with a network-based implementation for another system that may be utilized to facilitate DNS-AS techniques discussed herein, according to an example embodiment.

Referring to FIG. 4, FIG. 4 is a block diagram illustrating example details associated with a network-based implementation for another system 700 that may be utilized to facilitate DNS-AS techniques as presented herein to recover MP policy recommendations for one or more applications, generate a MP policy enforcement decision for an application, and enforce MP policy enforcement decisions for a HetNet architecture, according to an embodiment.

In at least one embodiment, elements of system 700 may be representative of elements that may be implemented for a 3GPP 5G core network (5GC or 5GCN), which may include a DNS proxy server 702, a Policy Control Function (PCF) 706, a Session Management Function (SMF) 710, and a User Plane Function (UPF) 714. DNS proxy server 702 may be configured with policy recommendation logic 704, PCF 706 may be configured with policy decision logic 708, SMF 710 may be configured with policy proxy logic 712, and UPF 714 may be configured with policy enforcement logic 716. Also shown in FIG. 4 are access networks 730, a client device 732, and data networks 740. One or more application(s) 734 may be configured for client device 732.

DNS proxy server 702 may interface with a DNS authoritative server (not shown in FIG. 4) and may also interface with PCF 706 via a policy API, which may be defined by a service provider, network operator, etc. based on the 3GPP-defined Service-Based Architecture (SBA), as may be prescribed at least by 3GPP Technical Specification (TS) 23.502 and 23.244. PCF 706 may further interface with SMF 710, which may further interface with UPF 714 utilizing any combination of 3GPP-defined interfaces.

UPF 714 may interface with access networks 730 via one or more network paths and access networks 730 may interface with client device 732 via any combination of wired and/or wireless interface(s). UPF 714 may also interface with data networks (DN) 740, which may be representative of any combination of the Internet, an IP Multimedia Subsystem (IMS), enterprise network, Ethernet and/or Ethernet switching systems, and/or the like.

Typically for a 3GPP 5GC, an Access and Mobility Management Function (AMF) (not shown in FIG. 4) provides access authentication services, authorization services, and mobility management control, while SMF 710 is responsible for session management with individual functions being supported on a per session basis and also for selection and control of a UPF (e.g., UPF 714) for data transfer for a client device, such as client device 732, with one or more data networks, such as data networks 740. The UPF 714 may operate as a Virtual Network Function (VNF) to provide packet routing and forwarding operations for user data traffic and may also perform a variety of functions such as packet inspection, traffic optimization, Quality of Service (QoS), billing, policy enforcement, billing operations, etc. for client device 732 Protocol Data Unit (PDU) sessions.

PCF 706 typically stores policy data for system 700 including but not limited to, network operator policies. For a 5GC, a Unified Data Management (UDM) entity (not shown), which may include and/or interface with one or more Unified Data Repositories (UDRs), typically stores subscription data and authentication data for subscribers (e.g., client device 732). A UDR typically stores policy data for subscribers that may be recovered/stored by a PCF, such as PCF 706.

During operation, DNS proxy server 702, via policy recommendation logic 704, may recover one or more MP policy recommendations for client device 732 application(s) 734 from a DNS authoritative source. Policy decision logic 708 of PCF 706 may obtain the MP policy recommendations and generate a MP policy enforcement decision. The MP policy enforcement decision can be obtained by policy enforcement logic 716 of UPF 714 via communications exchanged with policy proxy logic 712. UPF 714, via policy enforcement logic 716, can enforce the MP policy enforcement decision for one or more (downlink) packet flows that are to be communicated to client device 732 via one or more access networks 730.

In at least one embodiment, enforcing MP policy enforcement decision may include various operations such as, for example, identifying a particular packet/application packet flow as matching a particular MP policy enforcement decision/decision rule, selecting one or more interface(s), such as one or more network connection(s) configured for one or more communications unit(s) of UPF 714 associated with one or more network connection(s)/network path(s) for one or more corresponding access type(s) associated with access network(s)/network connection(s) identified by the particular MP policy enforcement decision/decision rule, and causing packets associated with the application packet flow to be transmitted using the selected interface(s).

Figure 5:
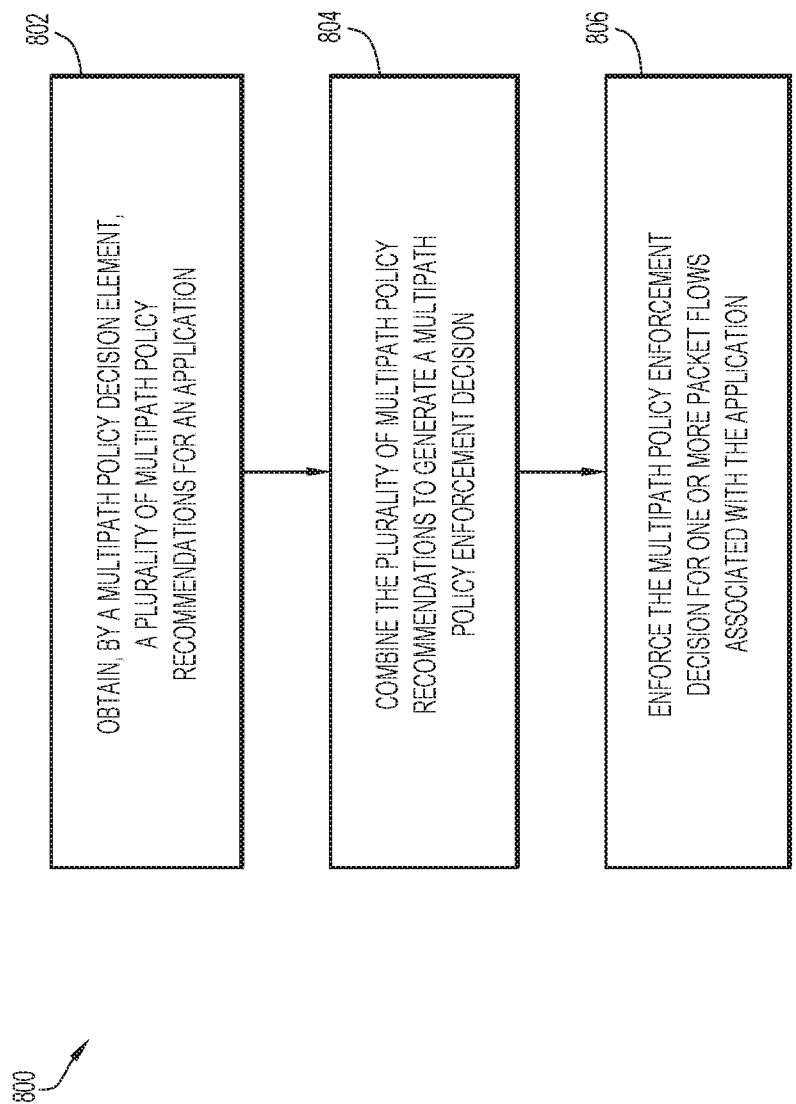
FIG. 5 is a flow chart depicting a method, according to an example embodiment.

Referring to FIG. 5, FIG. 5 is a flow chart depicting a method 800 according to an example embodiment. In particular, method 800 illustrates example operations that may be performed by one or more network entity/entities (e.g., any combination of a client device, one or more network element(s), etc.), to facilitate DNS-AS techniques presented herein, according to an example embodiment.

At 802, the method may include obtaining, by a multipath policy decision element, a plurality of multipath policy recommendations for an application in which the plurality of multipath policy recommendations are obtained from one or more multipath policy recommendation elements. The multipath policy recommendations may be associated with multipath policies for one or more packet flows of the application.

At 804, the method may include combining the plurality of multipath policy recommendations to generate a multipath policy enforcement decision in which the multipath policy enforcement decision identifies, at least in part, one or more network paths that are to be utilized for one or more packet flows associated with the application Each of the one or more network paths may be associated with an access type. In at least one embodiment, each multipath policy recommendation of the plurality of multipath policy recommendations may indicate an origin of the multipath policy recommendation such that the combining may include combining the plurality of multipath policy recommendations based on an origin of each multipath policy recommendation At 806, the method may include enforcing the multipath policy enforcement decision for one or more packet flow(s) associated with the application. In various embodiments, enforcing a multipath policy enforcement decision may include various operations such as, for example, identifying a particular packet/application packet flow as matching a particular multipath policy enforcement decision/decision rule, selecting one or more interface(s) (e.g., one or more radio(s) configured for one or more communications unit(s) of a client device associated with one or more access type(s) or one or more network connection(s) configured for one or more communications unit(s) of network element associated with one or more network connection(s)/network path(s) for one or more access type(s)) for corresponding with access network(s)/network connection(s) identified by the particular multipath policy enforcement decision/decision rule, and causing packets associated with the application packet flow to be transmitted using the selected interface(s). In some embodiments, enforcing a policy enforcement decision for one or more packet flow(s) may include enforcing any TAPS API based policies (e.g., primary/backup path preferences, capacity, bit rate, multipath protocol, MTU, enforcing certain tx/rx rate(s), service quality, etc., as may be defined for TAPS-based deployments).

Figure 6:
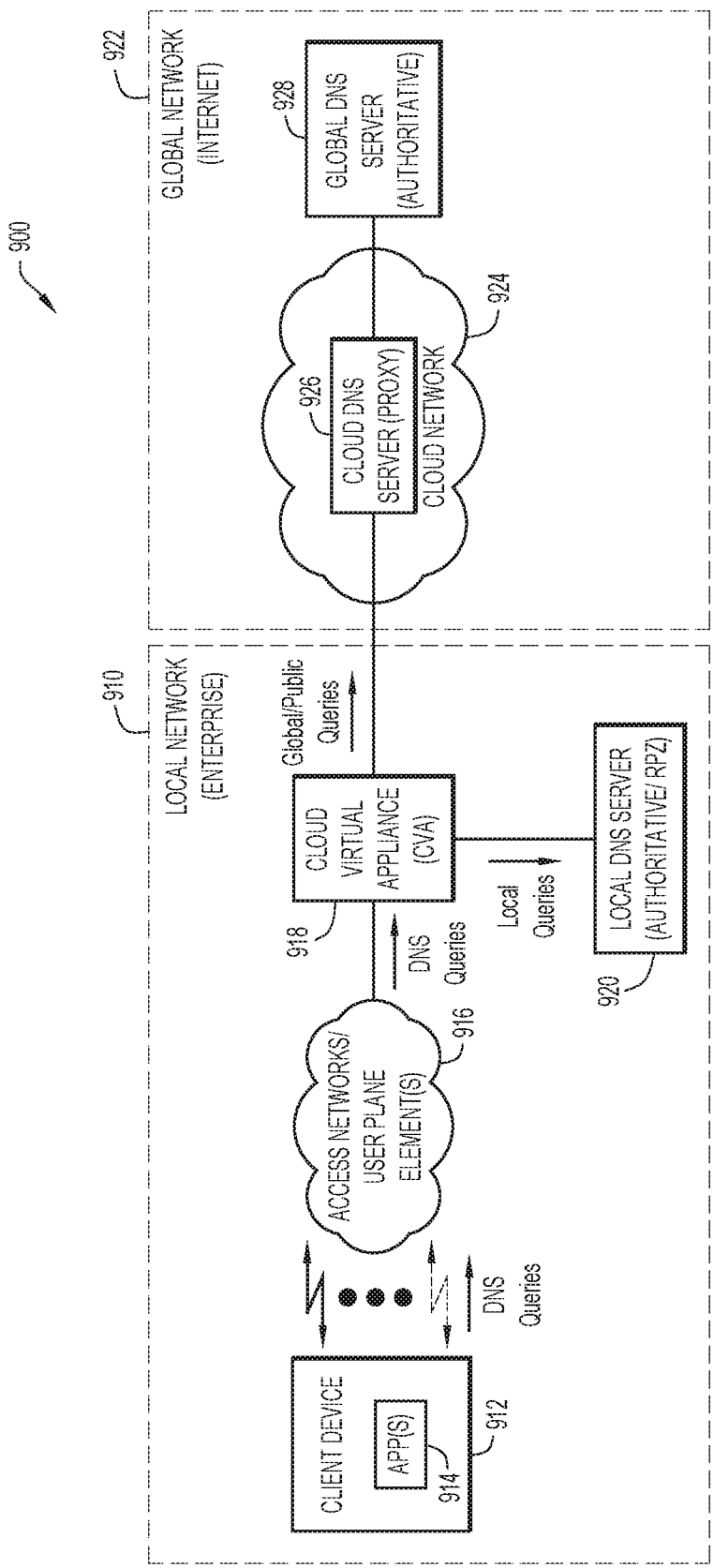
FIG. 6 is a block diagram illustrating example details of another system in which DNS-AS techniques may be implemented, according to an example embodiment.
Figure 7:
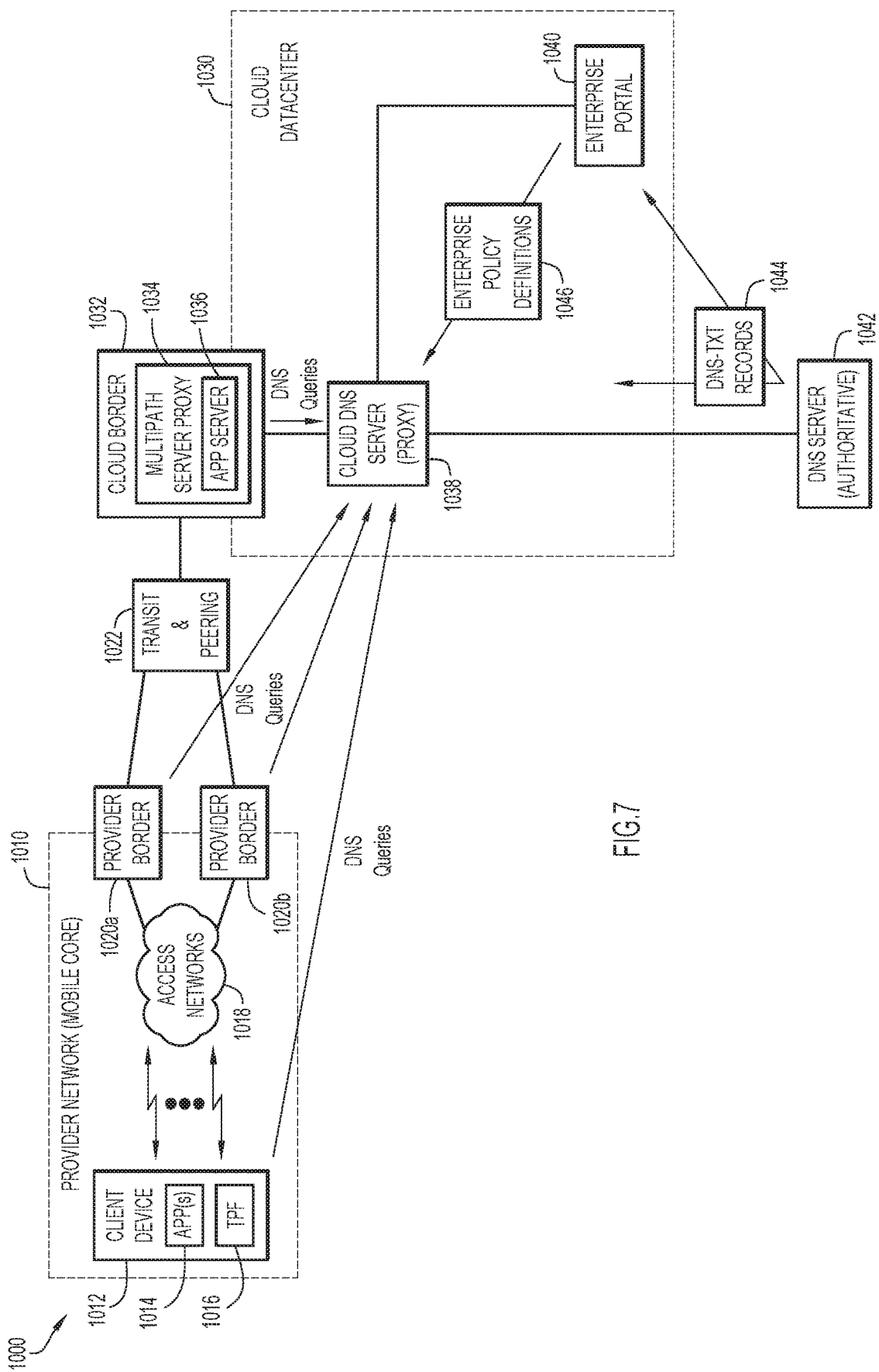
FIG. 7 is a block diagram illustrating example details of yet another system in which DNS-AS techniques may be implemented, according to an example embodiment.

FIG. 6 is a block diagram of another system 900 in which DNS-AS techniques may be implemented, according to an example embodiment. FIG. 7 is a block diagram of yet another system 1000 in which DNS-AS techniques may be implemented, according to an example embodiment. Discussions of other aspects of techniques herein are provided with reference to features illustrated in FIGS. 6 and 7, however, it is to be understood that features discussed for FIGS. 1, 2A-2B, 3A-3D, 4 and 5 can also be utilized for system 900 of FIG. 6 and system 1000 of FIG. 7.

Referring to FIG. 6, system 900 may include a local network 910 (such as an enterprise network) and a global network 922, such as the Internet, etc. Local network 910 may include a client device 912 having one or more application(s) 914 configured thereon, any combination of access networks/user plane elements 916, a cloud virtual appliance (CVA) 918, and a local authoritative DNS server 920 (which can included metadata configured with source=authoritative or RPZ). Global network 922 may include a cloud network 924, and a global authoritative DNS server 928 (which can include metadata configured with source=authoritative). Cloud network 924 may include a proxy cloud DNS server 926 (which can include metadata configured with source=proxy).

Client device/application(s) 912/914 may interface with access networks/user plane elements 916, which may further interface with CVA 918. CVA 918 may facilitate interfaces with local DNS server 920 and proxy cloud DNS server 926. Proxy cloud DNS server 926 may further interface with authoritative DNS server 928. CVA 918 may be instantiated be virtualized (virtual machine/hypervisor-based or container-based) cloud appliance that may be instantiated by a cloud provider within the local network 910 to provide DNS-AS techniques as discussed herein to facilitate multipath mobility for one or more application(s) operating via client device 912.

During operation, client device/application(s) 912/914 can perform DNS queries that are obtained by CVA 918. Based on the IP address of servers identified in the queries, CVA 918 forwards the queries the queries as global/public DNS queries toward proxy cloud DNS server/global DNS server 926/928 and/or local DNS queries toward local DNS server 920.

Referring to FIG. 7, system 1000 may include a provider network 1010 (such as a 4G/5G mobile network) and a cloud datacenter 1030. Provider network 1010 may include access networks 1018 and various provider border nodes 1020*a* and

1020b (e.g., user plane elements associated with different AN network paths). A client device 1012 is also shown in provider network 1010 in which the client device may include one or more application(s) 1014 and a third-party function (TPF) 1016 (e.g., an AnyConnect® function, an SD-WAN function, etc.).

For the embodiment of FIG. 7, consider that client device 1012 may be an enterprise device owned by an enterprise entity (not shown) such that client device 1012 may be mobile across enterprise-operated networks and 3GPP-based service provider operated networks yet enterprise policies may influence operation of client device for communicating packet flows for one or more application(s).

Further for system 1000, cloud datacenter 1030 may include a cloud border node 1032, a proxy cloud DNS server (which can include metadata configured with source=proxy), and an enterprise portal 1040 (e.g., a gateway or any other compute device). Cloud border node 1032 may include a multipath server proxy 1034, which include an application server 1036. Also shown in system 1000 are transit and peering (transit/peering) nodes 1022 (e.g., routers, switches, etc.) and an authoritative DNS server 1042 (which can include metadata configured with source=authoritative).

Provider border nodes 1020a, 1020b may interface with transit/peering nodes 1022, which may further interface with cloud border node 1032. Cloud border node 1032 may further interface with proxy cloud DNS server 1038, which may further interface with authoritative DNS server 1042 and enterprise portal 1040.

For the embodiment of FIG. 7, the cloud environment may offer the enterprise entity the capability to provide enterprise-specific multipath policy definitions 1046 via enterprise portal 1040

During operation, any of multipath application(s) 1014 provided for client device 1012, multipath aware network functions such as provider border nodes 1020a, 1020b, servers such as application servers 1036, and/or multipath server proxy 1034, may query cloud proxy DNS server 1038 to obtain MP policy recommendations for application(s) 1014. Cloud proxy DNS server 1038 can obtain DNS-TXT records 1044 from authoritative DNS server 1042 containing the MP policy recommendations (having metadata with source=authoritative) and can also provide MP policy recommendations (having metadata with source=proxy) based on the enterprise policy definitions 1046 configured by the enterprise entity via enterprise portal 1040. In some instances, DNS-TXT records 1044 obtained from authoritative DNS server 1042 by proxy cloud DNS server 1038 may be exposed to the enterprise entity via the enterprise portal 1040.

Thus, as illustrated in FIGS. 6 and 7, another aspect of techniques herein may provide for the ability to automate the instantiation of a cloud-based multipath proxy such as CVA 918 illustrated in FIG. 6 and multipath server proxy 1034 illustrated in FIG. 7 according to different configurations that may be provided via a cloud network. Further, in some embodiments, a cloud portal such as enterprise portal 1040 as illustrated in FIG. 7 may be implemented with ability to configure multipath policies on a per-domain basis.

Yet another aspect of techniques herein may provide for a multipath server proxy, such as multipath server proxy 1034, that is able to recover an application name and/or identity. In at least one embodiment, the multipath server proxy can be implemented utilizing a hybrid Information-Centric Networking (hICN) protocol in which an application name can be signaled to the multipath server proxy to recover a MP policy recommendation. For a hICN-based implementation, an application name can be encoded into any combination of a IP destination address field and/or a destination port field of an IP packet containing a DNS query.

In another embodiment, a multipath server proxy may be implemented using a MP-QUIC server proxy integrated with a HyperText Transfer Protocol (HTTP) load balancer that is signaled a requested URL. The multipath server proxy can recover the application name/URL and can request the associated DNS-TXT record from a corresponding DNS-AS system. In some implementations, a multipath server proxy may then be configured for handling downlink packets towards a client, in terms of whether to aggregate or operate over a single path.

Figure 8:
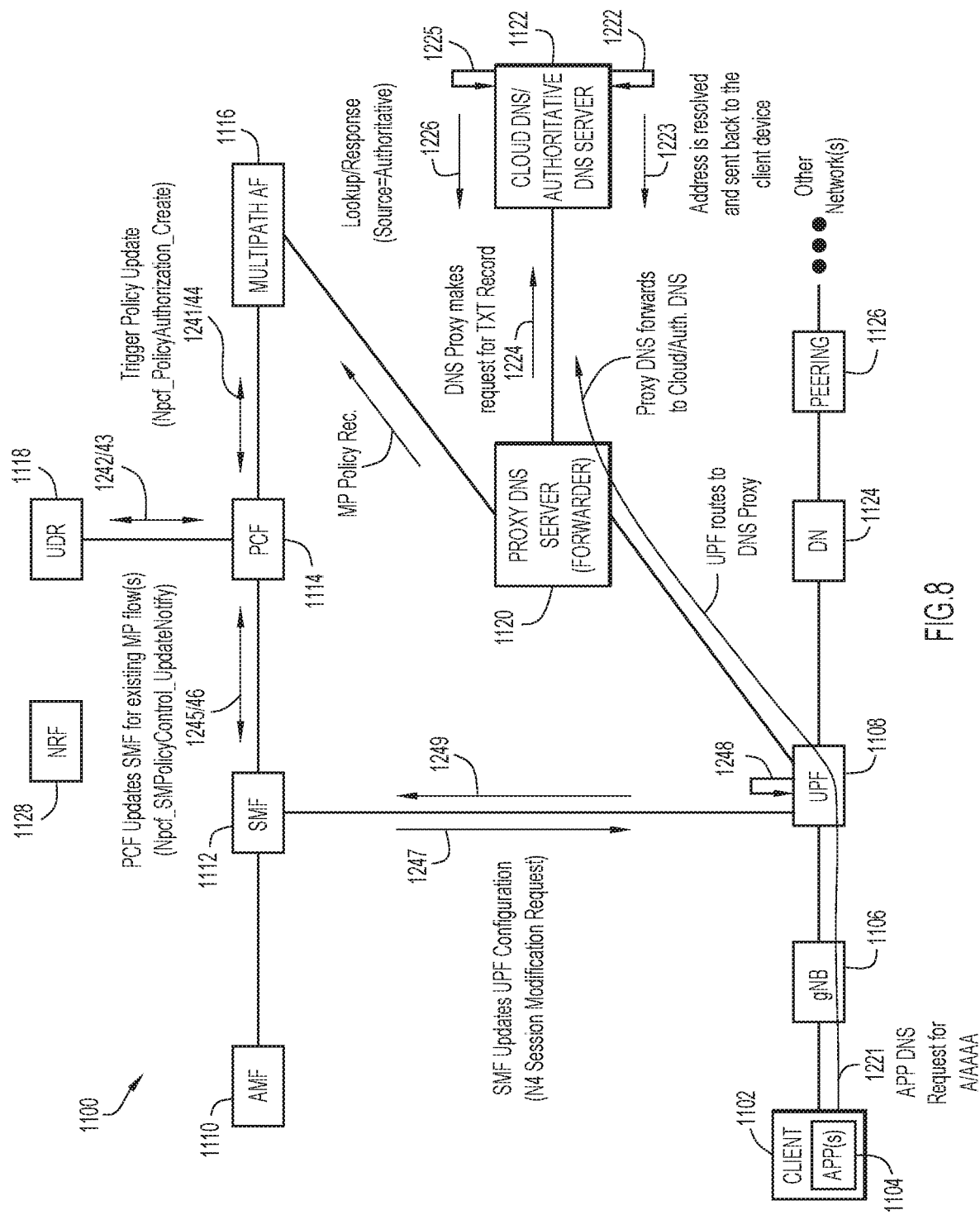
FIG. 8 is a block diagram illustrating example details of a system in which DNS-AS techniques may be implemented for a Third (3rd) Generation Partnership Project (3GPP) Fifth (5th) Generation (5G) core network architecture, according to an example embodiment.
Figure 9A:
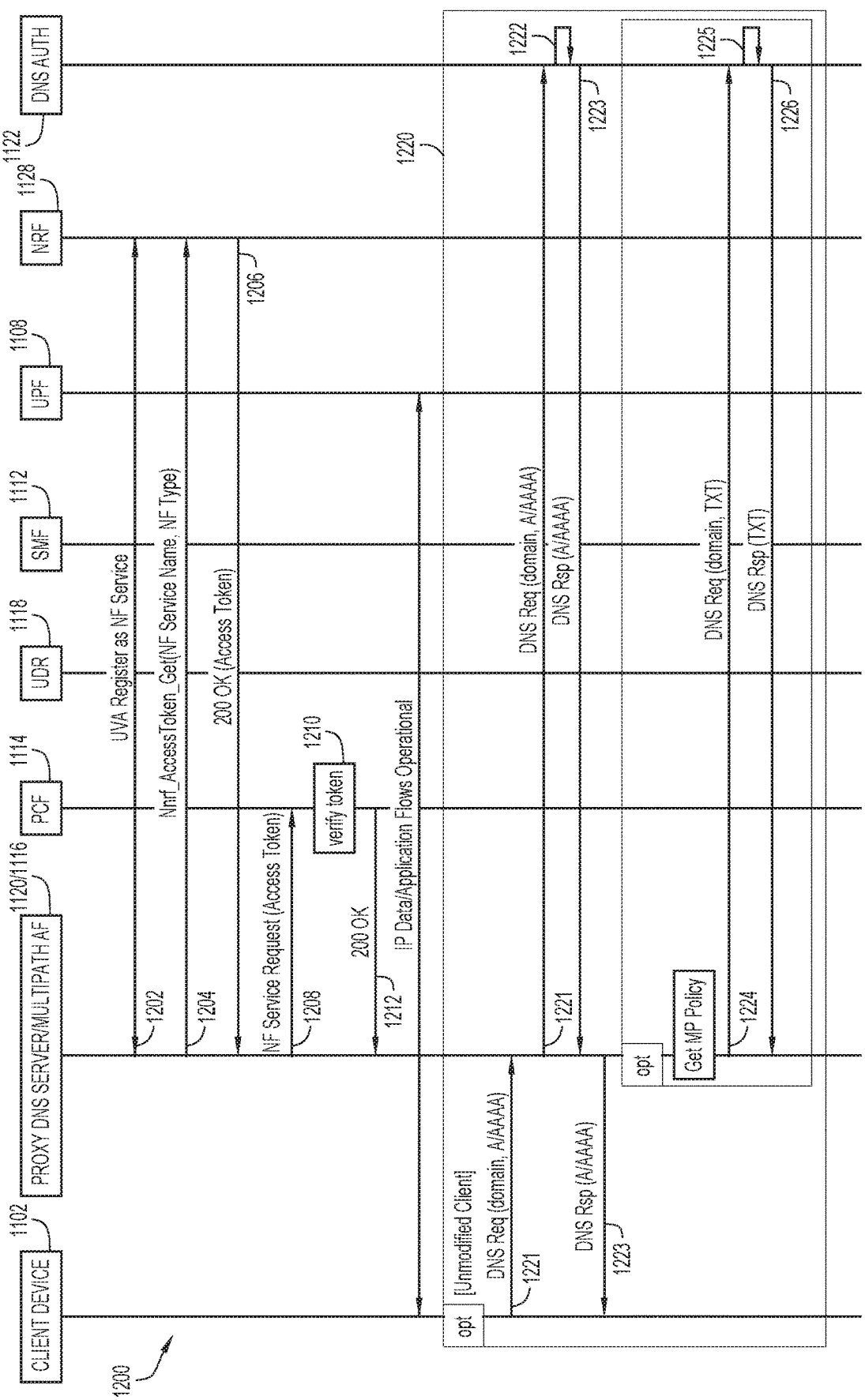
FIGS. 9A and 9B are a message sequence diagram illustrating a call flow associated with DNS-AS techniques that may be utilized to facilitate multipath mobility via the system of FIG. 8, according to an example embodiment.
Figure 9B:
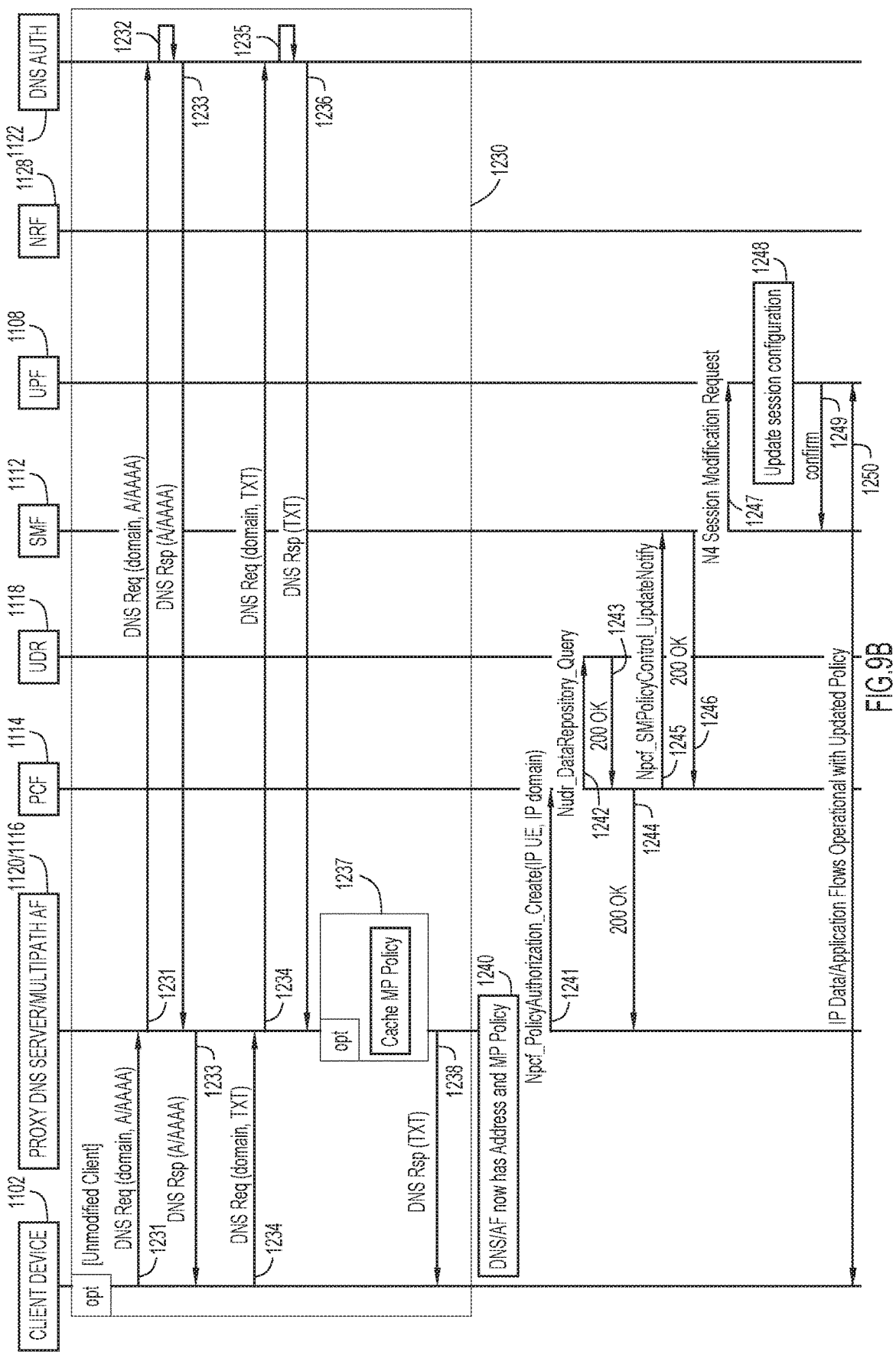

FIG. 8 is a block diagram illustrating example details of a system 1100 in which DNS-AS techniques may be implemented for a 3GPP 5GC network architecture, according to an example embodiment. FIGS. 9A and 9B are a message sequence diagram illustrating a call flow 1200 associated with DNS-AS techniques that may be utilized to facilitate multipath mobility via the system of FIG. 8, according to an example embodiment. Reference may be made to FIGS. 9A and 9B in discussing operational details associated with system 1100 of FIG. 8.

In at least one embodiment, system 1100 may include a client device 1102 configured with one or more applications 1104, gNB 1106, a UPF 1108, an Access and Mobility Management Function (AMF) 1110, an SMF 1112, a PCF 1114, a multipath application function (AF) 1116, a UDR 1118, a proxy DNS server 1120, and a cloud DNS and authoritative DNS server 1122 (which may be combined or separate DNS servers), data networks (DN) 1124, and peering nodes 1126 (e.g., routers, switches, etc.). Also shown in system 1100 is a Network Repository Function (NRF) 1128.

Client device 1102 may interface with gNB 1106 (via over-the-air RF communications). UPF 1108 may interface with gNB 1106, SMF 1112, proxy DNS server 1120, and DN 1124. DN 1124 may further interface with peering nodes 1126, which may facilitate communications with one or more other networks (e.g., local/enterprise networks, etc.). Proxy DNS server 1120 may further interface with cloud DNS/authoritative DNS servers 1122 and multipath AF 1116. Multipath AF 1116 may further interface with PCF 1114, which may further interface with UDR 1118 and SMF 1112. 1112 may further interface with AMF 1110 and, although not illustrated in FIG. 8, AMF 1110 may interface with gNB 1106. For ease of illustration only, network connections between NRF 1128 and other elements of system 1100 are omitted; however, it is to be understood that NRF 1128 may interface/interact with any core network elements of system 1100 for a 3GPP-defined Service Based Architecture, as may be prescribed at least by 3GPP TS 23.501, etc. In general, the NRF 1128 stores/updates/manages/etc. network function (NF) profiles of NF instances and their supported services, supports service discovery functions, and provides information of discovered NF instances.

For the embodiment of FIG. 8, consider that proxy DNS server 1120 and multipath AF 1116, combined, may represent a cloud virtual appliance.

With DNS-AS being defined for signalling per application MP policy recommendations to a client, as discussed for various embodiments herein, the same approach can be used to radically simplify the capability to enforce enterprise-defined, per-application MP policy in a network. By leveraging DNS-AS Application Visibility and Control (AVC) techniques, such as Next Generation Network Based Application Recognition (NBAR or NBAR2) application classification techniques, etc., policy enforcement can also be configured for third-party networks. For example, rather than integrating with an operators Policy and Charging Functionality, the configuration of a cloud virtual appliance, such as combined DNS proxy server 1120/multipath AF 1116 of FIG. 8, may enable the automatic signalling of per-enterprise HetNet multipath policies (policy recommendations) to a third-party network, which can then recover DNS-TXT record based multipath policy recommendations, generate a multipath policy enforcement decision, and enforce such on the particular network, e.g., using traffic classification in legacy LTE networks and even consuming multipath policies in the latest 5GCN systems that may be enhanced with multipath server proxy functionality.

Importantly, the interfaces between the cloud virtual appliance and a 4G/5G Core Network can be based on established 3GPP-defined 5G Service Based Architecture (SBA), as shown in FIG. 8. In some embodiments, the same application identifier tags typically used in conventional AVC and/or network-based application Recognition (NBAR) deployments can be re-used to activate pre-defined multipath policies in the 5GC, without then involving integration of all enterprise applications into the 5G SBA architecture.

In contrast to alternative approaches that involve HetNet multipath policy exposure via new API gateways and new relationships between a HetNet service provider and each individual enterprise, the cloud approach provided herein may leverage a cloud-based enterprise security service portal (e.g., enterprise portal 1040 as shown in FIG. 7) in order to deliver HetNet multipath policies to enterprise devices (e.g., client device 1012 of FIG. 7, client device 1102 of FIG. 8, etc.), while simultaneously supporting partner service provider networks via a simple Service Base Architecture integration to the cloud virtual appliance.

As noted, various operational features that may be associated with system 1100 of FIG. 8 may be discussed with reference to FIGS. 9A and 9B, which is a message sequence diagram of a call flow 1200 associated with DNS-AS techniques that may be utilized to provide multipath mobility for the system of FIG. 8, according to an example embodiment.

Consider for the embodiment of FIGS. 8 and 9A-9B, that client device 1102 may or may not be configured with multipath awareness. Stated differently, one or more applications 1104 of client device 1102 may or may not be multipath aware applications. Thus, different operational features are illustrated in the call flow 1200 considering that client device 1102 may be an unmodified (non-multipath aware) client device, as shown with reference to operations 1220, and also considering that client device 1102 may be a modified (multipath aware) client device, as shown with reference to operations 1230.

To being, operations 1202, 1204, 1206, 1208, 1210, and 1212 illustrate operations associated with combined proxy DNS server/multipath AF 1120/1116 registering with NRF 1128 for AF service availability and obtaining access credentials (access token) from the NRF 1128, as well as requesting/obtaining service with PCF 1114. At 1214, IP data/application flows may be operational between the client device 1102 and the UPF 1108.

Consider DNS-AS operations that may be performed for an unmodified client device 1102, as shown at 1220. At 1221 consider that client device 1102 initiates a DNS request for an A/AAAA record for a domain <DOMAIN>, which is forwarded via UPF 1108 to proxy DNS server 1120 and further forwarded via proxy DNS server 1120 to cloud DNS/authoritative DNS server 1122 at 1221b. At 1222/1223, the address is resolved and sent back to client device 1102 (e.g., following a reverse path via proxy DNS server 1120, UPF 1108, etc.).

At 1224, consider that proxy DNS server 1120 autonomously performs a DNS query toward cloud/authoritative DNS server 1122 for one or more DNS-TXT record(s) for the domain (to recover multipath policy recommendation(s)). At 1225/1226, cloud/authoritative DNS server 1122 performs a lookup for the domain and provides a response to proxy DNS server 1120 including one or more DNS-TXT record(s) containing the multipath policy recommendation(s) for one or more application(s) (e.g., application(s) 1104 provisioned for client device 1102).

Consider other DNS operations that may be performed for a modified client device 1102, as shown at 1230. For operations 1230, consider that DNS A/AAAA record query operations may be performed at 1231, 1232, and 1233 similar to those discussed above corresponding to 1221, 1222, and 1223, respectively. Further consider at 1234, that client device 1102 initiates a DNS request for DNS-TXT records for the domain, which proxy DNS server 1120 may forward to cloud/authoritative DNS server 1122. Proxy DNS server 1120 may determine whether or not to forward a DNS request based on whether or not information corresponding to the request is cached at the server. At 1235, consider that cloud/authoritative DNS server 1122 performs a lookup and responds at 1236 with one or more DNS-TXT record(s) containing the multipath policy recommendation(s) for one or more application(s). The response can be cached at the combined proxy DNS server 1120/AF 1116, as shown at 1237, and can be forwarded to client device 1102 at 1238.

At 1240, consider that combined proxy DNS server 1120/AF 1116 now has the IP address of the client (determined via the A/AAAA DNS resolver exchange), and the multipath policy recommendation(s) signalled via the DNS-TXT record(s) from cloud/authoritative DNS server 1122. At 1241, consider that combined proxy DNS server 1120/AF 1116 triggers a policy update toward PCF 1114 that includes an identifier of multipath AF 1116, the IP address of client device 1102, and the generated multipath policy enforcement decision.

Operations at 1241, 1242, 1243, 1244, 1245, and 1246 involve the multipath AF pushing the multipath policy through the PCF 1114 (which has the capability to update an established flow) into the SMF 1112. At 1247 and 1248, SMF 1112 updates the N4 session for client device 1102 via UPF 1108 and the UPF confirms the update to the SMF at 1249. At 1250, IP data/application flows for client device 1102 are operational via UPF 1108 with the updated policy.

Figure 10A:
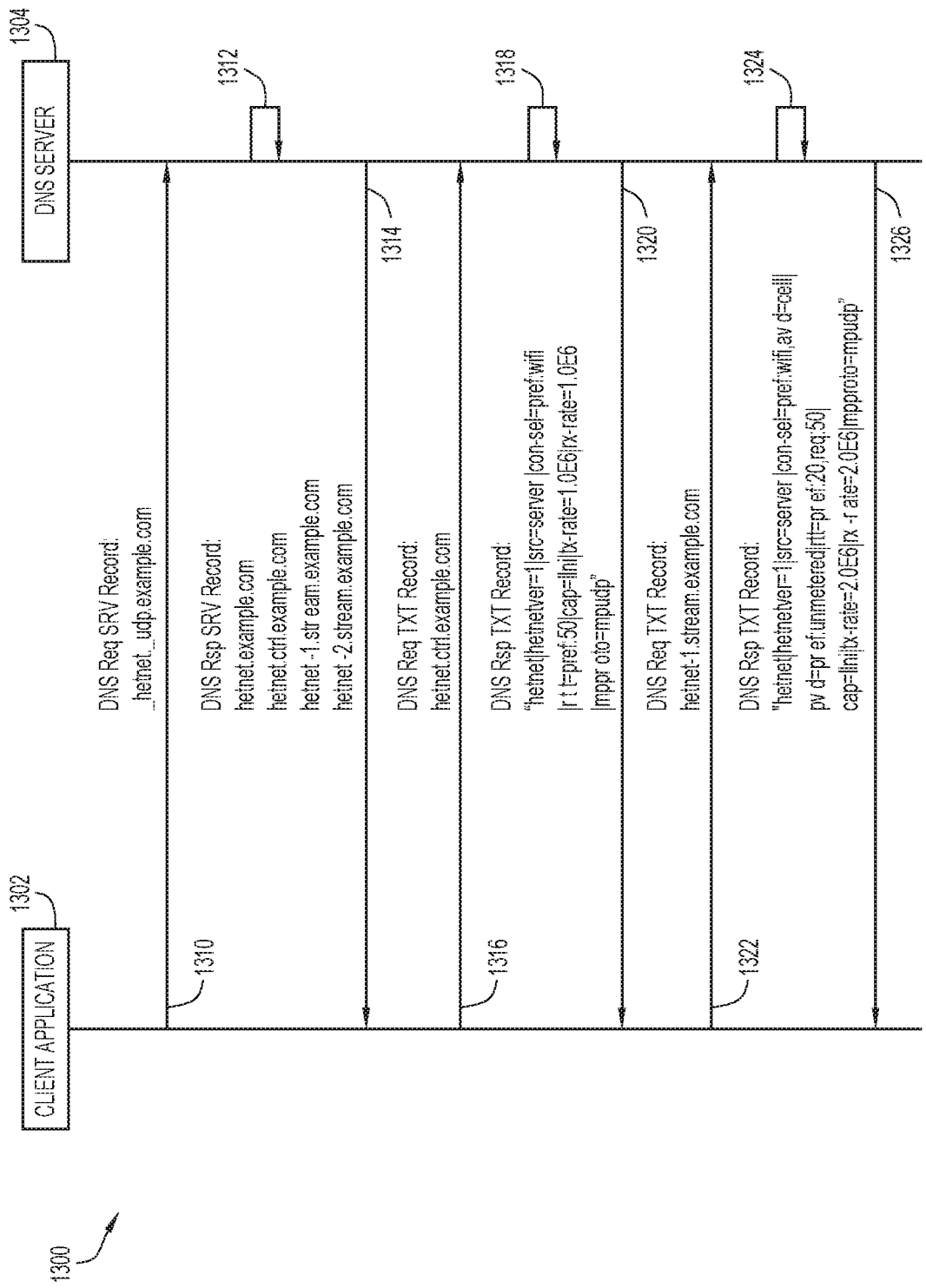
FIGS. 10A and 10B are diagrams illustrating example details associated with utilizing DNS service (SRV) records to facilitate various DNS-AS techniques, according to an example embodiment.
Figure 10B:
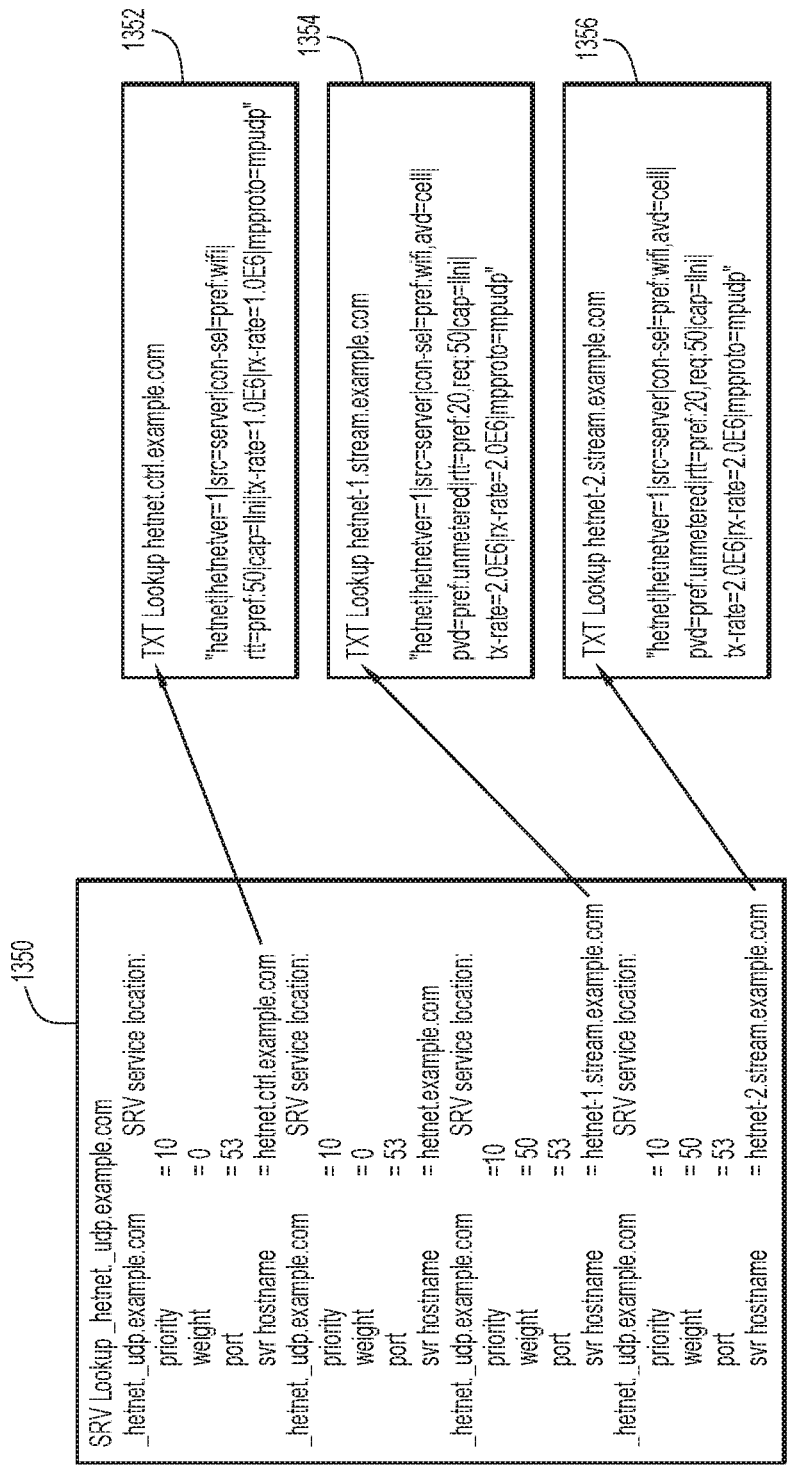

Referring to FIGS. 10A and 10B, FIGS. 10A and 10B are diagrams illustrating example details associated with utilizing DNS service (SRV) records to facilitate various DNS-AS techniques, according to an example embodiment. In particular, FIG. 10A is a message sequence diagram of a call flow 1300 associated with DNS-AS techniques utilizing DNS SRV records, according to an example embodiment involving a client application 1302 and a DNS server 1304. FIG. 10B illustrates an example SRV record 1350 and various example TXT records 1352, 1354, and 1356 that may be stored/provisioned for DNS server 1304. Reference may be made to FIG. 10B in discussing features associated with FIG. 10A.

Conventionally, DNS SRV records are intended to allow administrators to utilize several servers for a single domain, to move services from host to host with little fuss, and to designate some hosts as primary servers for a service and others as backups. During operation in a conventional DNS SRV implementation, a client may request a specific service/protocol for a specific domain and receive the names of any available servers for that domain. For example: '_sip._udp-.sip.voice.google.com'.

In accordance with DNS-AS techniques herein, a different usage for DNS SRV records may be provided in that SRV records may be used as a map from a root domain to define which sub-domains contain DNS-AS TXT records that store hetnet multipath policy recommendations. During operation in accordance with embodiments herein, a client can utilize a request such as '_hetnet._udp' as the service/protocol (suggesting DNS lookups on User Datagram Protocol (UDP)). Using this technique, sub-domains can be reported under a root domain with associated priority, weight, and port used in a similar manner as the conventional use of SRV records (e.g., for load and server balancing).

Consider an operational example as illustrated via call flow 1300, in which SRV record 1350 and DNS-AS TXT records 1352, 1354, and 1356 are provisioned for DNS server 1304. At 1310, consider that client application 1302 performs a DNS request for a SRV record associated with root domain '_hetnet._udp.example.com'. At 1312, DNS server 1304 performs a lookup and, based on identifying SRV record 1350 for the root domain, returns sub-domains: 'hetnet.ctrl.example.com', hetnet-1.stream.example.com', and 'hetnet-2.stream.example.com' along with associated priority, weight, and port information associated the root domain and each corresponding sub-domain at 1314.

At 1316, consider that client application 1302 performs a DNS request for TXT record(s) associated with sub-domain 'hetnet.ctrl.example.com'. At 1318, consider that DNS server 1304 performs a lookup for DNS TXT record(s) associated with the sub-domain and, based on identifying TXT record 1352, responds to client application 1302 with the hetnet multipath policy recommendation for the associated sub-domain, as shown at 1320. A similar request/lookup/response exchange can be performed for sub-domain 'hetnet-1.stream.example.com' at 1322, 1324, and 1326. Although not illustrated in FIG. 10A, a similar exchange can be performed for sub-domain 'hetnet-2.stream.example.com' (and or any other sub-domains, if configured).

Thus, as illustrated in FIGS. 10A-10B, utilization of sub-domain information for DNS SRV records may provide an efficient technique to scale direct client request for DNS-AS TXT records.

Referring to FIG. 11, FIG. 11 illustrates a hardware block diagram of a computing device 1400 that may perform the functions of a client device or a network element for various DNS-AS techniques discussed herein. It should be appreciated that FIG. 11 provides only an illustration of one embodiment and does not imply any limitations with regard to the environments in which different embodiments may be implemented. Many modifications to the depicted environment may be made. In various embodiments, a computing device, such as computing device 1400 or any combination of computing devices 1400, may be configured as any of a client device, a proxy DNS server, an authoritative DNS server, a cloud virtual appliance, a combined multipath AF/proxy DNS server, a PCF, an SMF, a UPF, and/or any other element/function/etc. as discussed for the techniques depicted in connection with FIGS. 1, 2A-2B, 3A-3D, 4-8, 9A-9B, and 10A-10B.

As depicted, the computing device 1400 includes a bus 1412, which provides communications between computer processor(s) 1414, memory 1416, persistent storage 1418, one or more communications units 1420, and input/output (I/O) interface(s) 1422. Bus 1412 can be implemented with any architecture designed for passing data and/or control information between processors (such as microprocessors, communications and network processors, etc.), system memory, peripheral devices, and any other hardware components within a system. For example, bus 1412 can be implemented with one or more buses.

Memory 1416 and persistent storage 1418 are computer readable storage media, which can be inclusive on non-transitory computer readable storage media. In the depicted embodiment, memory 1416, which may be inclusive of one or more memory element(s), includes random access memory (RAM) 1424 and cache memory 1426. In general, memory 1416 can include any suitable volatile or non-volatile computer readable storage media. Instructions for any combination of control logic 1440, policy recommendation logic 1442, policy decision logic 1444, and/or policy enforcement logic 1446 may be stored in memory 1416 and/or persistent storage 1418 for execution by processor(s) 1414.

When the processor(s) 1414 execute any combination of control logic 1440, policy recommendation logic 1442, policy decision logic 1444, and/or policy enforcement logic 1446, the processor(s) 1414 are caused to perform the operations described above in connection with FIGS. 1, 2, 3A-3D, 4-8, 9A-9B, and 10A-10B such as, for example, obtaining one or more multipath policy recommendation(s) for an application (e.g., via DNS-TXT record(s) and/or via one or more multipath aware application(s) (for a TAPS API implementation, for example)), generating a multipath policy enforcement decision (e.g., via combining multipath policy recommendations), enforcing the multipath policy enforcement decision for one or more packet flow(s) for the application, and/or any other operations involving various DNS-AS techniques as discussed for various embodiments described herein.

One or more programs and/or other logic may be stored in persistent storage 1418 for execution by one or more of the respective computer processors 1414 via one or more memory element(s) of memory 1416. The persistent storage 1418 may be a magnetic hard disk drive, a solid state hard drive, a semiconductor storage device, read-only memory (ROM), erasable programmable read-only memory (EPROM), flash memory, or any other computer readable storage media that is capable of storing program instructions or digital information.

The media used by persistent storage 1418 may also be removable. For example, a removable hard drive may be used for persistent storage 1418. Other examples include optical and magnetic disks, thumb drives, and smart cards that are inserted into a drive for transfer onto another computer readable storage medium that is also part of persistent storage 1418.

Communications units 1420, in these examples, provides for communications with other data processing systems, networks, and/or devices. In these examples, each communications unit 1420 may include at least one interface (IF) 1421, which may facilitate communications with systems, networks, and/or devices utilizing any combination of cellular hardware, software, etc. (e.g., 4G radios, 5G radios, etc. as discussed herein), Wi-Fi® hardware, software, etc. (e.g., Wi-Fi® radios, etc. as discussed herein), wired hardware, software, etc. (e.g., network interface cards, etc.) to facilitate one or more connections for communications discussed herein. Accordingly, communications units 1420 may provide communications through the use of any combination of physical wired and/or wireless communications links.

I/O interface(s) 1422, which may be inclusive of one or more network interface cards (NICs), allows for input and output of data with other devices that may be connected to computing device 1400. For example, I/O interface 1422 may provide a connection to external devices 1428 such as a keyboard, keypad, a touch screen, and/or some other suitable input device. External devices 1428 can also include portable computer readable storage media such as database systems, thumb drives, portable optical or magnetic disks, and memory cards.

Software and data used to practice embodiments can be stored on such portable computer readable storage media and can be loaded onto persistent storage 1418 via I/O interface(s) 1422. I/O interface(s) 1422 may also connect to a display 1430. Display 1430 provides a mechanism to display data to a user and may be, for example, a computer monitor.

In one form, a computer-implemented method is provided that may include obtaining, by a multipath policy decision element, a plurality of multipath policy recommendations for an application, wherein the plurality of multipath policy recommendations are obtained from one or more multipath policy recommendation elements; combining the plurality of multipath policy recommendations to generate a policy enforcement decision, wherein the policy enforcement decision identifies, at least in part, one or more network paths that are to be utilized for one or more packet flows associated with the application, wherein each of the one or more network paths is associated with an access type; and enforcing the policy enforcement decision for one or more packet flows associated with the application.

In at least one instance, enforcing the policy enforcement decision may include selecting the one or more network paths for communicating the one or more packet flows associated with the application; and transmitting the one or more packet flows associated with the application via the one or more network paths.

In at least one instance, each multipath policy recommendation of the plurality of multipath policy recommendations may indicate an origin of a multipath policy recommendation element from which the multipath policy recommendation is obtained in which the method may further include combining the plurality of multipath policy recommendations based on an origin of each multipath policy recommendation element.

In at least one instance, an origin of at least one multipath policy recommendation of the plurality of multipath policy recommendations indicates that the at least one multipath policy recommendation is recommended by a policy recommendation element that is authoritative for the application. In at least one instance, an origin of at least one multipath policy recommendation of the plurality of multipath policy recommendations indicates that the at least one multipath policy recommendation is recommended by a policy recommendation element that is non-authoritative for the application. In at least one instance, the origin of the at least one multipath policy recommendation of the plurality of multipath policy recommendations indicates that the at least one multipath policy recommendation is recommended by a multipath policy recommendation element that is operated by an enterprise domain.

In at least one instance, each multipath policy recommendation of the plurality of multipath policy recommendations may be provided in a corresponding Domain Name System (DNS) resource record. In at least one instance, each multipath policy recommendation of the plurality of multipath policy recommendations may be encoded in a DNS text (TXT) resource record.

In at least one instance, the multipath policy decision element may be an application function of a client device in which the method may further include configuring, by the multipath policy decision element, one or more settings of a transport services Application Programming Interface (API) based on the policy enforcement decision; obtaining, by a transport layer of the multipath policy decision element, the one or more settings of the transport services API; and configuring the transport layer to enforce the policy enforcement decision.

In at least one instance, the multipath policy decision element may be a transport layer of a client device in which the method may include providing, by a transport services Application Programming Interface (API) of an application function of the client device, and indication that the transport layer of the client device is to generate the policy enforcement decision.

In at least one instance, the multipath policy decision element may be a network policy function element in which the obtaining further comprises obtaining a first multipath policy recommendation indicating that the network transport layer element is to configure a multipath service for supporting the packet flows associated with the application, the first multipath policy recommendation comprising a first capacity profile and a first multipath protocol for transporting the packet flows associated with the application, the obtaining further comprising obtaining, from a policy Application Programming Interface (API), a second multipath policy recommendation comprising a second capacity profile and a second multipath protocol for transporting the packet flows associated with the application.

In summary, techniques herein provide systems and methods that enables the definition of multipath policies for one or more applications and signaling multipath policies to one or more remote devices using enhanced DNS-AS techniques. In one embodiment, a remote client device may combine DNS-AS components (e.g., multipath policies, components of multipath policies, etc.) to determine a multipath policy enforcement decision associated with a particular application. In another embodiment, network functions may utilize DNS-AS techniques to determine multipath policy enforcement decisions within a network.

The programs described herein are identified based upon the application for which they are implemented in a specific embodiment. However, it should be appreciated that any particular program nomenclature herein is used merely for convenience, and thus the embodiments should not be limited to use solely in any specific application identified and/or implied by such nomenclature.

Communications in a network environment can be referred to herein as 'messages', 'messaging', 'signaling', 'data', 'content', 'objects', 'requests', 'queries', 'responses', 'replies', etc. which may be inclusive of packets. Additionally, messages, requests, responses, replies, queries, etc. are forms of network traffic and, therefore, may comprise one or more packets. As referred to herein and in the claims, the term 'packet' may be used in a generic sense to include packets, frames, segments, datagrams, and/or other generic data units that may be used to transmit communications (e.g., data, commands, etc.) in a network environment. A packet is a formatted unit of data that can contain control or routing information (e.g., source and destination address, source and destination port, etc.) and data, which is also sometimes referred to as a payload or data payload. In some embodiments, control or routing information, management information, or the like can be included in packet fields, such as within header(s) and/or trailer(s) of packets. IP addresses as referred to herein may encompass any implantation of IP version 4 (IPv4) and/or IP version 6 (IPv6) addresses.

The terms 'data', 'information', 'parameters,' and the like as used herein can refer to any type of binary, numeric, voice, video, textual or script data or information or any type of source or object code, or any other suitable data or information in any appropriate format that can be communicated from one point to another via electronic devices and/or networks.

Data relating to operations described herein may be stored within any conventional or other data structures (e.g., files, arrays, lists, stacks, queues, records, etc.) and may be stored in any desired storage unit (e.g., database, data or other repositories, queue, etc.). The data transmitted between entities may include any desired format and arrangement, and may include any quantity of any types of fields of any size to store the data. The definition and data model for any datasets may indicate the overall structure in any desired fashion (e.g., computer-related languages, graphical representation, listing, etc.).

The present embodiments may employ any number of any type of user interface (e.g., Graphical User Interface (GUI), command-line, prompt, etc.) for obtaining or providing information, where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The environment of the present embodiments may include any number of computer or other processing systems (e.g., client or end-user systems, server systems, etc.) and databases or other repositories arranged in any desired fashion, where the present embodiments may be applied to any desired type of computing environment (e.g., cloud computing, client-server, network computing, mainframe, stand-alone systems, etc.). The computer or other processing systems employed by the present embodiments may be implemented by any number of any personal or other type of computer or processing system (e.g., desktop, laptop, PDA, mobile devices, etc.), and may include any commercially available operating system and any combination of commercially available and custom software (e.g., machine learning software, etc.). These systems may include any types of monitors and input devices (e.g., keyboard, mouse, voice recognition, etc.) to enter and/or view information.

Each of the elements described herein may couple to and/or interact with one another through interfaces and/or through any other suitable connection (wired or wireless) that provides a viable pathway for communications. Interconnections, interfaces, and variations thereof discussed herein may be utilized to provide connections among elements in a system and/or may be utilized to provide communications, interactions, operations, etc. among elements that may be directly or indirectly connected in the system. Any combination of interfaces can be provided for elements described herein in order to facilitate operations as discussed for various embodiments described herein.

It is to be understood that the software of the present embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present embodiments may alternatively be implemented by any type of hardware and/or other processing circuitry.

The various functions of the computer systems or other processing systems may be distributed in any manner among any number of software and/or hardware modules or units, processing or computer systems and/or circuitry, where the computer or processing systems may be disposed locally or remotely of each other and communicate via any suitable communications medium (e.g., Local Area Network (LAN), Wide Area Network (WAN), wireless LAN (WLAN), Intranet, Internet, hardwire, modem connection, wireless, etc.). For example, the functions of the present embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present embodiments may be available on a non-transitory computer useable medium, non-transitory computer readable storage medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

A network may be implemented by any number of any type of network (e.g., LAN, WAN, WLAN, Internet, Intranet, Virtual Private Network (VPN), etc.). The computer or other processing systems of the present embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., LAN, hardwire, wireless link, Intranet, etc.).

A system or computing device may employ any number of any conventional or other databases, data stores or storage structures (e.g., files, databases, data structures, data or other repositories, etc.) to store information. The database system may be implemented by any number of any conventional or other databases, data stores or storage structures (e.g., files, databases, data structures, data or other repositories, etc.) to store information. A database system may be included within or coupled to a server and/or client systems. The database systems and/or storage structures may be remote from or local to the computer or other processing systems, and may store any desired data.

The embodiments presented may be in various forms, such as a system, a method, and/or a computer program product at any possible technical detail level of integration. The computer program product may include a computer readable storage medium (or media) having computer readable program instructions thereon for causing a processor to carry out aspects of presented herein.

The computer readable storage medium, which can be inclusive of non-transitory computer readable storage medium, can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects presented herein.

Aspects of the present embodiments are described herein with reference to flow chart illustrations and/or block diagrams of methods, apparatus (systems), and computer program products according to the embodiments. It will be understood that each block of the flow chart illustrations and/or block diagrams, and combinations of blocks in the flow chart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flow chart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flow chart and/or block diagram block or blocks.

The flow chart and block diagrams in the figures illustrate the architecture, functionality, and operation of possible implementations of systems, methods, and computer program products according to various embodiments. In this regard, each block in the flowchart or block diagrams may represent a module, logic, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flow chart illustration, can be implemented by special purpose hardware-based systems that perform the specified functions or acts or carry out combinations of special purpose hardware and computer instructions.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
obtaining, by a client device, a plurality of multipath policy recommendations for an application operating via the client device, wherein each multipath policy recommendation of the plurality of multipath policy recommendations includes an origin indicator identifying a source from which each multipath policy recommendation is obtained, and wherein the obtaining includes performing at least one Domain Name System (DNS) service (SRV) record request for a domain to determine one or more sub-domains associated with the domain and performing at least one DNS text (TXT) resource record request for at least one sub-domain of the one or more sub-domains to obtain at least one multipath policy recommendation for the application that is associated with the at least one sub-domain;
combining, by the client device, the plurality of multipath policy recommendations based, at least in part, on the origin indicator included in each multipath policy recommendation to generate a policy enforcement decision, wherein the policy enforcement decision identifies, at least in part, one or more network paths that are to be utilized for one or more packet flows associated with the application, wherein each of the one or more network paths is associated with an access network type; and
enforcing the policy enforcement decision via a transport layer of the client device for the one or more packet flows associated with the application.

2. The method of claim 1, wherein enforcing the policy enforcement decision comprises:
selecting the one or more network paths for communicating the one or more packet flows associated with the application; and
transmitting the one or more packet flows associated with the application via the one or more network paths.

3. The method of claim 1, wherein an origin indicator of at least one multipath policy recommendation of the plurality of multipath policy recommendations indicates that the at least one multipath policy recommendation is recommended by an authoritative source for the application.

4. The method of claim 1, wherein the combining is performed via an application function of the client device, the method further comprising:
configuring, by the application function, one or more settings of a transport services Application Programming Interface (API) based on the policy enforcement decision;
providing, by the application function, the one or more settings of the transport services API to the transport layer of the client device; and
configuring the transport layer to enforce the policy enforcement decision.

5. The method of claim 1, further comprising:
providing, by a transport services Application Programming Interface (API) of an application function of the client device, and indication that the transport layer of the client device is to generate the policy enforcement decision, wherein the combining is performed via the transport layer of the client device.

6. The method of claim 1, wherein an origin indicator of at least one multipath policy recommendation of the plurality of multipath policy recommendations indicates that the at least one multipath policy recommendation is recommended by a non-authoritative source for the application.

7. The method of claim 6, where the origin indicator of the at least one multipath policy recommendation of the plurality of multipath policy recommendations indicates that the at least one multipath policy recommendation is recommended for an enterprise domain.

8. The method of claim 1, wherein each multipath policy recommendation of the plurality of multipath policy recommendations is provided in a corresponding DNS resource record.

9. The method of claim 8, where each multipath policy recommendation of the plurality of multipath policy recommendations is encoded in a DNS TXT resource record.

10. The method of claim 1, wherein a particular multipath policy recommendation of the plurality of multipath policy recommendations identifies an access network type that is preferred for the one or more packet flows associated with the application.

11. The method of claim 10, wherein the particular multipath policy recommendation further comprises an access network type that is to be avoided for the one or more packet flows associated with the application.

12. The method of claim 1, wherein the plurality of multipath policy recommendations includes a first multipath policy recommendation that includes a first origin indicator identifying a first source from which the first multipath policy recommendation is obtained and a second multipath policy recommendation that includes a second origin indicator identifying a second source from which the second multipath policy recommendation is obtained, and wherein the first source is different than the second source.

13. The method of claim 12, wherein the first origin indicator identifies the first source as a Domain Name System-as-an Authoritative Source (DNS-AS) server and the second origin indicator identifies the second source as a proxy DNS server.

14. The method of claim 12, wherein the combining is based on the first multipath policy recommendation that identifies the first source taking precedence over the second multipath policy recommendation that identifies the second source.

15. The method of claim 14, wherein the first source is an application provider of the application and the second source is an enterprise network with which the client device is connected.

16. One or more non-transitory computer readable storage media encoded with instructions that, when executed by a processor, cause the processor to perform operations, comprising:
obtaining, by a client device, a plurality of multipath policy recommendations for an application operating via the client device, wherein each multipath policy recommendation of the plurality of multipath policy recommendations includes an origin indicator identifying a source from which each multipath policy recommendation is obtained, and wherein the obtaining includes performing at least one Domain Name System (DNS) service (SRV) record request for a domain to determine one or more sub-domains associated with the domain and performing at least one DNS text (TXT) resource record request for at least one sub-domain of the one or more sub-domains to obtain at least one multipath policy recommendation for the application that is associated with the at least one sub-domain;
combining, by the client device, the plurality of multipath policy recommendations based, at least in part, on the origin indicator included in each multipath policy recommendation to generate a policy enforcement decision, wherein the policy enforcement decision identifies, at least in part, one or more network paths that are to be utilized for one or more packet flows associated with the application, wherein each of the one or more network paths is associated with an access network type; and enforcing the policy enforcement decision via a transport layer of the client device for the one or more packet flows associated with the application.

17. The media of claim 16, wherein enforcing the policy enforcement decision comprises:

selecting the one or more network paths for communicating the one or more packet flows associated with the application; and transmitting the one or more packet flows associated with the application via the one or more network paths.

18. A client device comprising:

at least one memory element for storing data; and at least one processor for executing instructions associated with the data, wherein executing the instructions causes the client device to perform operations, comprising:

obtaining a plurality of multipath policy recommendations for an application operating via the client device, wherein each multipath policy recommendation of the plurality of multipath policy recommendations includes an origin indicator identifying a source from which each multipath policy recommendation is obtained, and wherein the obtaining includes performing at least one Domain Name System (DNS) service (SRV) record request for a domain to determine one or more sub-domains associated with the domain and performing at least one DNS text (TXT) resource record request for at least one sub-domain of the one or more sub-domains to obtain at least one multipath policy recommendation for the application that is associated with the at least one sub-domain;

combining the plurality of multipath policy recommendations based, at least in part, on the origin indicator included in each multipath policy recommendation to generate a policy enforcement decision, wherein the policy enforcement decision identifies, at least in part, one or more network paths that are to be utilized for one or more packet flows associated with the application, wherein each of the one or more network paths is associated with an access network type; and enforcing the policy enforcement decision via a transport layer of the client device for the one or more packet flows associated with the application.

19. The client device of claim 18, wherein enforcing the policy enforcement decision comprises:

selecting the one or more network paths for communicating the one or more packet flows associated with the application; and transmitting the one or more packet flows associated with the application via the one or more network paths.

20. The client device of claim 18, wherein a particular multipath policy recommendation of the plurality of multipath policy recommendations identifies an access network type that is preferred for the one or more packet flows associated with the application.

* * * * *